US007684934B2

(12) United States Patent
Shvartsburg et al.

(10) Patent No.: US 7,684,934 B2
(45) Date of Patent: Mar. 23, 2010

(54) PATTERN RECOGNITION OF WHOLE CELL MASS SPECTRA

(75) Inventors: Alexandre Shvartsburg, Richland, WA (US); Jon G. Wilkes, Little Rock, AR (US); Paul Chiarelli, Chicago, IL (US); Ricky D. Holland, Sheridan, AR (US); Dan A. Buzatu, Benton, AR (US); Michael A. Beaudoin, Little Rock, AR (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 1437 days.

(21) Appl. No.: 10/863,745

(22) Filed: Jun. 7, 2004

(65) Prior Publication Data

US 2005/0061967 A1 Mar. 24, 2005

Related U.S. Application Data

(60) Provisional application No. 60/476,435, filed on Jun. 6, 2003.

(51) Int. Cl.
*G06F 19/00* (2006.01)

(52) U.S. Cl. .................................................. 702/27

(58) Field of Classification Search .................... 702/27
See application file for complete search history.

(56) References Cited

U.S. PATENT DOCUMENTS 4,772,560 A 9/1988 Attar et al.
4,840,919 A 6/1989 Attar et al.
6,177,266 B1 1/2001 Krishnamurthy et al.
6,618,712 B1 * 9/2003 Parker et al. .................. 706/15

OTHER PUBLICATIONS

Krishnamurthy et al., "Liquid Chromatography/Microspray Mass Spectrometry for Bacterial Investigations," Rapid Communications in Mass Spectrometry (1999) vol. 13, pp. 39-49.*

Krishnamurthy et al. "Rapid Identification of Bacteria by Direct Matrix-assisted Laser Desorption/Ionization Mass Spectrometric Analyis of Whole Cells," Rapid Communications in Mass Spectrometry (1996) vol. 10, pp. 1992-1996.*

Vaidyanathan, Seetharaman et al.; "Flow-Injection Electrospray Ionization Mass Spectrometry of Crude Cell Extracts for High-Throughput Bacterial Identification"; 2002, *American Society for Mass Spectrometry*, vol. 13, pp. 118-128.

* cited by examiner

*Primary Examiner*—Jerry Lin
(74) *Attorney, Agent, or Firm*—Teddy C. Scott, Jr.; Polsinelli Shughart PC

(57) ABSTRACT

A method for reproducibly analyzing mass spectra from different sample sources is provided. The method deconvolutes the complex spectra by collapsing multiple peaks of different molecular mass that originate from the same molecular fragment into a single peak. The differences in molecular mass are apparent differences caused by different charge states of the fragment and/or different metal ion adducts and/or reactant products of one or more of the charge states. The deconvoluted spectrum is compared to a library of mass spectra acquired from samples of known identity to unambiguously determine the identity of one or more components of the sample undergoing analysis.

32 Claims, 8 Drawing Sheets
(4 of 8 Drawing Sheet(s) Filed in Color)

MALDI-MS of Bovine Insulin,
mass 5732

- Acetone added to
  matrix-Insulin solution.
- 3 adducts formed,
  (3 lysines)
- acetone Schiff bass rxn.
  (acetone less $H_2O$)
- each adduct, + 40 amu

- Spectrum of +2 charged
  Ion shows 3 Adducts,
  only 20 amu apart.

| 1 m/z | 1 intensity | 2 m/z | 2 intensity | 3 m/z | 3 intensity |
|---|---|---|---|---|---|
| 6168.61832 | 40.15 | 3085.4460 | 30.66 | 2058.59568 | 6.27 |
| 6125.88023 | 5.18 | 3062.94016 | 8.96 | 0.0 | 0.0 |
| 5734.50113 | 11.18 | 2869.06783 | 6.33 | 0.0 | 0.0 |
| 5177.29962 | 89.89 | 2590.71118 | 46.17 | 0.0 | 0.0 |
| 5013.64925 | 7.02 | 2506.126 | 5.89 | 0.0 | 0.0 |
| 4928.87637 | 6.75 | 2462.74090 | 2.00 | 0.0 | 0.0 |
| 4683.2486 | 4.06 | 2342.19995 | 4.59 | 0.0 | 0.0 |
| 4339.44463 | 4.6 | 2171.90065 | 2.9 | 0.0 | 0.0 |
| 4279.43801 | 100.0 | 2140.52409 | 38.24 | 0.0 | 0.0 |

Figure 5

| | | |
|---|---|---|
| **Same-Serotype-** Average Correlation | 0.63 | 0.67 |
| **Between-Serotype-** Average Correlation | 0.59 | 0.60 |
| **Difference** | **0.04** | **0.07** |

| | | |
|---|---|---|
| KEY: | Non-deconvoluted | Deconvoluted |

Figure 8

| | | |
|---|---|---|
| **Same**-Group Average Correlation | 0.73 | 0.85 |
| **Between**-Groups Average-Correlation | 0.44 | 0.33 |
| **Difference** | **0.29** | **0.52** |

| | | |
|---|---|---|
| KEY: | Non-deconvoluted | Deconvoluted |

PATTERN RECOGNITION OF WHOLE CELL MASS SPECTRA

CROSS-REFERENCE TO RELATED PATENT APPLICATIONS

The present application claims benefit of priority to U.S. Provisional Patent Application No. 60/476,435, filed Jun. 6, 2003, which is incorporate by reference for any purpose.

BACKGROUND OF THE INVENTION

Instrumental techniques for identifying one or more components of a complex mixture are of use in diverse fields. Mass spectrometry is a robust and versatile instrumental technique that provides the ability to rapidly sort through complex mixtures and identify the components of the mixture.

The use of mass spectrometry to analyze mixtures of proteins, peptides, oligonucleotides, and noncovalent complexes is rapidly being adopted in biological research, especially for proteome characterization, protein profiling and genomics. There is a well-recognized need for the high throughput identification of these and other species, for example proteins and their post-translational modifications that are, for example, up-regulated or down-regulated in response to a specific external stimulus, the onset of disease, or normal aging.

The conventional approach to analyzing complex biological mixtures involves the high resolution separation of components of the mixture using 2D polyacrylamide gel electrophoresis followed by their one-at-a-time excision and characterization, increasingly exploiting mass spectrometry. Additional information is generally gathered in the form of a correlation between the peptide masses for peptide fingerprinting (e.g., their common origin from a single protein), or by partial peptide sequencing. However, even with complete automation of separations and sample processing there are practical limitations upon the throughput of these methods.

Mass spectrometry is also of interest for the identification of microorganisms. Chemotaxonomy of microorganisms based upon their spectroscopic, spectrometric, and chromatographic characteristics represents a useful method for the identification of microorganisms such as yeasts, fungi, protozoa, viruses and bacteria. Typically, such chemotaxonomic methods are based upon instrumental methods that provide "fingerprint" spectra or chromatograms (i.e., spectra or chromatograms that are unique to each type of microorganism). Such fingerprinting methods include mass spectrometric methods, infrared spectroscopy, ion mobility spectrometry, gas chromatography, liquid chromatography, nuclear magnetic resonance, and various hyphenated techniques such as gas chromatography-mass spectrometry (GC-MS) and high performance liquid chromatography-Fourier transform infrared spectroscopy (HPLC-FTIR).

Recently, mass spectrometric techniques have been developed for generating specific protein profiles for various biological agents. These techniques generally employ electrospray ionization (ESI) or matrix-assisted laser desorption ionization (MALDI) of protein extracts followed by mass spectrometric (MS) or tandem mass spectrometric (MS/MS) analysis. ESI and MALDI are ionization techniques that have enabled dramatic progress to be made in performing mass spectrometry on large biomolecules including proteins. MALDI, combined with time-of-flight mass spectrometry (TOF-MS), has been used to differentiate biological agents using a crude protein extract. For example, Krishnamurthy and coworkers have developed methods and apparatus for identifying biological agents through the automated detection of biomarkers such as proteins released from extracts or whole intact biological agents that may be present in an environmental or biological sample. See, U.S. Pat. No. 6,558,946.

Instrumental fingerprinting methods, such as mass spectrometry, tend to suffer from irreproducibility due to both instrumental and environmental factors. For example, continued use of a mass spectrometer leads to contamination of the ion optics and thus can lead to alterations in the appearance of a microorganism's fingerprint mass spectrum. Changes in microorganism characteristics due to environmental factors, such as the patient from which the organism is isolated, or the growth medium used to culture the microorganism, can also alter the appearance of a microorganism's fingerprint spectrum. Irreproducibility of spectral data due to instrumental and environmental sources makes it difficult to classify or identify microorganisms based on fingerprint spectral patterns.

An effective method for characterizing the components of a complex mixture must be rapid, sensitive, selective, and cost-effective. The use of higher mass accuracy mass measurements has the potential to greatly speed characterization of the components of complex mixtures. Sufficiently high mass measurement accuracy, in principal, can enable the identification of a protein from a single peptide mass. Moreover, the methods should be reliably repeatable across an array of similar samples that are analyzed at different times. To this end, methods have been developed for calibrating analytical instruments. For example, U.S. Pat. No. 5,710,713 describes a method for determining whether, and by how much the sensitivity or bias of an mass spectrometer may have drifted outside an acceptable, application-defined tolerance level throughout a spectral region of interest. Generally, this method involves determining relative instrument bias by using spectra, of at least a single standard, acquired at different times, or on different instruments. The observed changes in the spectra are used to generate a mathematical function of the change in instrument bias.

In another approach described in U.S. Pat. No. 6,498,340, a mass spectrometer is calibrated by shifting the parameters used by the spectrometer to assign masses to the spectra in a manner which reconciles the signal of ions within the spectra having equal mass but differing charge states, or by reconciling ions having known differences in mass to relative values consistent with those known differences. The method makes use of data along the X-axis (m/z) only and does not utilize the Y-axis data (intensity). Moreover, the method does not identify the components of complex mixtures by comparing the processed mass spectra to a library reference set of similarly processed mass spectra.

Processing of more complex mixtures for ever higher throughput analyses, such as the analysis of complex mixtures of biological agents, e.g., microorganisms, results in much greater demands on mass spectrometry, in terms of speed, resolution, mass measurement accuracy, and data-dependent acquisition. Moreover, there is need for a method that can be practiced by a technician in the field, hospital, or clinical laboratory or in bioprocessing and manufacturing. As such, calibration schemes that can enable higher mass accuracy measurements to be accomplished over a wide range of conditions play an essential role in the successful application of mass spectrometry to protein identification from complex peptide mixtures. The present invention meets these needs.

BRIEF SUMMARY OF THE INVENTION

It has now been discovered that the accuracy of mass spectral identification of the components of a complex mixture can be dramatically improved by deconvoluting the mass spectral data and comparing the deconvoluted data to a library reference set of similarly deconvoluted data acquired from samples of known identity. The present invention is described herein by reference to its use to identify a microorganism in an analyte mixture. The focus of the discussion on this embodiment is for clarity of illustration only and is not intended to limit the types of analyte mixtures with which the invention can be practiced.

Rapid and accurate identification of biological agents is essential in diagnosing diseases, anticipating epidemic outbreaks, monitoring food supplies for contamination, regulating bioprocessing operations, and detecting agents of war. Rapidly distinguishing between related biological agents especially pathogenic agents and unambiguously identifying species and strains in complex matrices is highly desirable, especially for the purpose of risk assessment in field situations.

Classification of biological agents such as bacteria and viruses has traditionally relied on biochemical and morphological tests. Several analytical techniques are now available, which enhance the speed and accuracy of the identification of biological agents. The methods are based on the examination of structural or functional components of biological agents to identify chemotaxonomic markers, which are specific for a particular species. The chemotaxonomic markers, or biomarkers, can include any one or a combination of the classes of molecules present in the cells, e.g., lipids, phospholipids, lipopolysaccharides, oligosaccharides, proteins, and DNA. Although they represent an improvement in throughput relative to classical methods of identification, the methods that rely on the detection of biomarkers, particularly those utilizing mass spectrometry, suffer from poor reproducibility.

Mass spectrometry is an important tool for use in chemical analysis. One problem inherent in the field of mass spectrometry is that, over extended periods of time, mass spectrometers can experience sensitivity drift or mass discrimination drift, which is also referred to as instrument bias. Mass discrimination in a mass spectrometer may be described as the favorable or unfavorable transmission of ions of a particular mass-to-charge (m/z) relative to ions at other m/z values in the mass range of the instrument. In other words, mass discrimination drift describes mass dependent changes in transmission across the mass range of the instrument. Furthermore, the overall sensitivity of the spectrometer may change independent of m/z, which may be attributed to a change in detector sensitivity. This shift is termed sensitivity drift.

In mass spectrometry, calibration of an instrument consists of constructing a model from standards that relates the individual components in a mixture to the spectral response of the mixture. Unfortunately, typical models do not perform well over extended periods of time without recalibrating the instrument to account for instrumental sensitivity drift or mass discrimination drift. Such instrument changes directly affect the relationship between the respective responses of the standards and their concentrations in the originally constructed model. Generally, these instrumental changes are corrected by generating a new calibration model that again relates the component response to concentration. For the analysis of multicomponent mixtures, total recalibration can be a costly and time-consuming process which removes the instrument from its intended application. Even for those cases where the instrument can be autocalibrated, other concerns frequently arise relating to cost, long term analyte stability, and the handling of potentially toxic analytical standards.

In addition to variations within a single instrument, another problem in chemical analysis is the variation in instrument bias among different instruments. Such variation can cause the spectrum of the same compound obtained on different instruments to differ substantially in appearance. This variation does not allow for the transfer of the previously mentioned models between instruments because the bias across the spectral range is unique to each individual instrument.

The present invention provides a method of correcting spectral data for drift and other factors that lead to irreproducibility between spectra of similar samples. The method is applicable to samples that include any mixture of chemical and/or biological species. In the first step, the mass spectral data is deconvoluted by combining data from a set of peaks of a mass spectrum of the sample. The set of peaks represent different charge states of a molecular fragment of a component of said sample, different adducts (including but not limited to metal adducts)of a molecular fragment of a component of said sample, different solvent interaction products of a molecular fragment of a component of said sample, different water loss of a molecular fragment of a component of said sample, different isotopes from a molecular fragment of a component of said sample, or other chemical interactions that may occur during mass spectrometry to form multiple, predictable peaks representing a single molecular fragment. Each different charge state of a molecular fragment gives rise to a unique peak in the mass spectrum corresponding to that charge state of the fragment. Thus, for a single molecular fragment, peaks arise for each singly and multiply charged state of the fragment. Moreover, metal ion and other adducts of the different charge states of individual fragments are commonly formed during the acquisition of the mass spectrum.

A representative deconvolution algorithm combines the Y-axis data, i.e., peak height, for the determinable charge states of a plurality of fragments originating from a particular sample. The algorithm results in the formation of a single peak that encompasses two or more determinable peaks originating from the charge states of a particular fragment.

The algorithm also optionally combines Y-axis data for the determinable metal ion adduct peaks originating from a molecular fragment detected by the mass spectrometer. Thus, there is produced a single peak corresponding to two or more determinable metal ion or other adducts of a particular fragment.

In yet another embodiment, the algorithm combines Y-axis data from the various charge states of a fragment and the various metal ion adducts of the same fragment. In this embodiment, a single peak is produced that is representative of two or more determinable charge state and metal ion adduct of a particular fragment.

The present invention also provides a method for identifying an analyte by comparing a mass spectrum of the analyte, deconvoluted as described above, with a library reference set of mass spectra acquired from samples of known identity. The library data is generally deconvoluted using a method similar to that used to process the experimental data. Library searching techniques are commonly employed to assist and expedite the identification of spectra from unknown compounds. Typical library searching techniques consist of matching an unknown spectrum with entries in a spectral reference library. Analytes in the library that have similar spectra to the unknown can be tabulated according to a numerical similarity index generated by a statistical algorithm.

The present invention preferably utilizes mass spectrometric techniques including, but not limited to, matrix-assisted laser desorption ionization (MALDI) and electrospray ionization (ESI) incorporating techniques such as nanospray and microspray ionization to generate ionized biomolecules for analysis in a mass spectrometer. The mass spectrometer generates a unique mass spectral profile of the components that are present in the sample. These profiles effectively provide a means for distinguishing between bacteria of different genera, species, and strains. Due to the deconvolution method of the invention, comparable profiles are generated when the method is performed under different conditions or using different ESI or MALDI instruments.

Additional objects, advantages and embodiments of the invention will be apparent from the detailed description that follows.

BRIEF DESCRIPTION OF THE DRAWINGS

The patent or application file contains at least one drawing executed in color. Copies if this patent or patent application publication with color drawings will be provided by the Office upon request and payment of the necessary fee.

FIG. 5 is a table that shows correlation values for replicate analyses compared to cross-correlation values for 15 strains of four *Salmonella serotypes* known by PFGE to differ. These samples were prepared fresh and analyzed over several different analytical sessions, but each spectrum had the same laser intensity. The bottom part of the table (labeled "difference") shows average difference between average correlations among the same serotypes compared to average correlations between different serotypes. Deconvolution resulted in improved ability to distinguish different serotypes. This indicates that deconvolution can improve MALDI MS specificity from the species to the serotype level.

FIG. 8 shows an analysis of healthy and cancerous rat liver samples analyzed as described for FIG. 5 and in Example 2.

DETAILED DESCRIPTION OF THE INVENTION

Definitions

Figure 1:
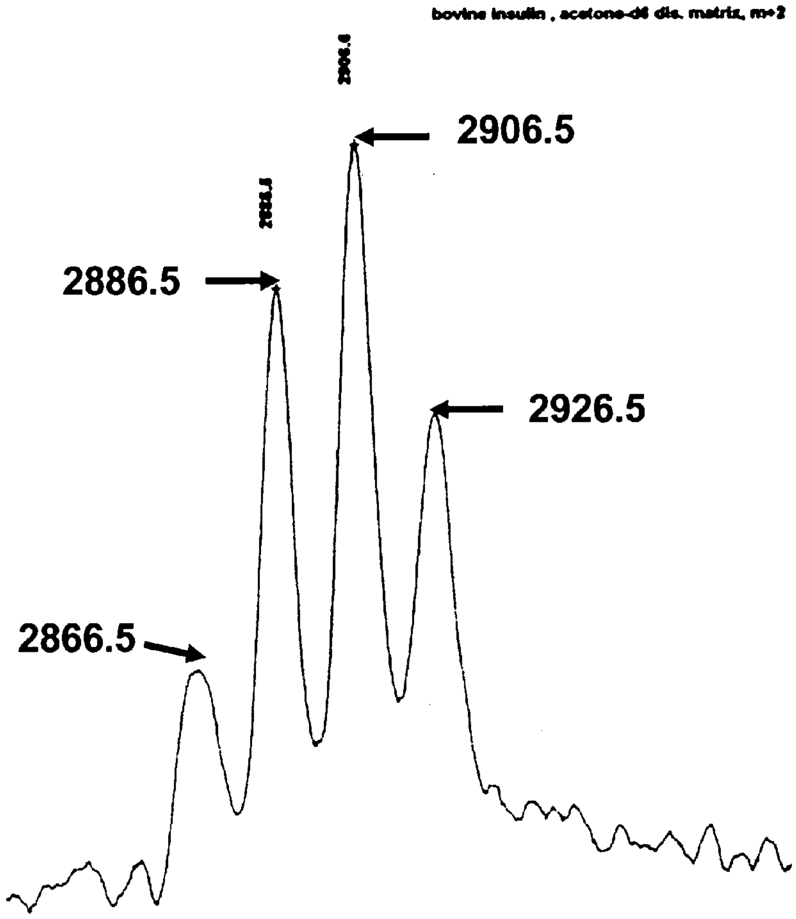
FIG. 1 is a scanned image showing the M+ peak of bovine insulin (three lysines) plus acetone Schiff bass reaction products (acetone less OH, 17 amu) at 40 amu intervals above the M+1 ion. The figure demonstrates the use of reaction products (a) to establish the ion charge state of the left-most peak and (b) to count the number of lysines in the protein. The particular instrument on which the spectrum was acquired had poor mass resolution, (approximatelyl 50 amu), yet the adduct peaks are clearly resolved.

As used herein, the term "analyte desorption/ionization" refers to converting an analyte into the gas phase as an ion.

"AMU," as used herein refers to "atomic mass unit."

The term "matrix" refers to a plurality-of generally acidic, energy absorbing chemicals (e.g., nicotinic or sinapinic acid) that assist in the desorption (e.g., by laser irradiation) and ionization of the analyte into the gaseous or vapor phase as intact molecular ions.

The term "determinable" refers to a molecular fragment that gives rise to a peak that is detected by a mass spectrometer and which is sufficiently resolved from one or more additional peaks in the spectrum that the data contained in the peak can be submitted to data processing as discussed herein.

As used herein, "desorption" refers to the departure of analyte from the surface and/or the entry of the analyte into a gaseous phase.

As used herein, "ionization" refers to the process of creating or retaining on an analyte an electrical charge equal to plus or minus one or more electron units.

The term "molecular fragment" refers to fragments (cleavage products), multiply-charged species, and metal ion (e.g., $Na^+$, $K^+$) adducts as well.

"Analyte," as utilized herein refers to the species of interest in an assay mixture. Exemplary analytes include, but are not limited to cells and portions thereof, enzymes, antibodies and other biomolecules, drugs, pesticides, herbicides, agents of war and other bioactive agents. The analyte can be derived from any sort of biological source, including body fluids such as blood, serum, saliva, urine, seminal fluid, seminal plasma, lymph, and the like. It also includes extracts from biological samples, such as cell lysates, cell culture media, or the like. For example, cell lysate samples are optionally derived from, e.g., primary tissue or cells, cultured tissue or cells, normal tissue or cells, diseased tissue or cells, benign tissue or cells, cancerous tissue or cells, salivary glandular tissue or cells, intestinal tissue or cells, neural tissue or cells, renal tissue or cells, lymphatic tissue or cells, bladder tissue or cells, prostatic tissue or cells, urogenital tissues or cells, tumoral tissue or cells, tumoral neovasculature tissue or cells, or the like.

The term "substance to be assayed" as used herein means a substance, which is detected qualitatively or quantitatively by the process or the device of the present invention. Examples of such substances include antibodies, antibody fragments, antigens, polypeptides, glycoproteins, polysaccharides, complex glycolipids, nucleic acids, effector molecules, receptor molecules, enzymes, inhibitors and the like.

The term, "assay mixture," refers to a mixture that includes the analyte and other components. The other components are, for example, diluents, buffers, detergents, and contaminating species, debris and the like that are found mixed with the analyte. Illustrative examples include urine, sera, blood plasma, total blood, saliva, tear fluid, cerebrospinal fluid, secretory fluids from nipples and the like. Also included are solid, gel or sol substances such as mucus, body tissues, cells and the like suspended or dissolved in liquid materials such as buffers, extractants, solvents and the like.

As used herein, "nucleic acid" means DNA, RNA, single-stranded, double-stranded, or more highly aggregated hybridization motifs, and any chemical modifications thereof. Modifications include, but are not limited to, those providing chemical groups that incorporate additional charge, polarizability, hydrogen bonding, electrostatic interaction, and fluxionality to the nucleic acid ligand bases or to the nucleic acid ligand as a whole. Such modifications include, but are not limited to, peptide nucleic acids (PNAs), phosphodiester group modifications (e.g., phosphorothioates, methylphosphonates), 2'-position sugar modifications, 5-position pyrimidine modifications, 8-position purine modifications, modifications at exocyclic amines, substitution of 4-thiouridine, substitution of 5-bromo or 5-iodo-uracil; backbone modifications, methylations, unusual base-pairing combinations such as the isobases, isocytidine and isoguanidine and the like. Nucleic acids can also include non-natural bases, such as, for example, nitroindole. Modifications can also include 3' and 5' modifications such as capping with a fluorophore or another moiety.

"Peptide" refers to a polymer in which the monomers are amino acids and are joined together through amide bonds, alternatively referred to as a polypeptide. When the amino acids are α-amino acids, either the L-optical isomer or the D-optical isomer can be used. Additionally, unnatural amino acids, for example, β-alanine, phenylglycine and homoarginine are also included. Commonly encountered amino acids that are not gene-encoded may also be used in the present invention. All of the amino acids used in the present invention may be either the D- or L-isomer. The L-isomers are generally preferred. In addition, other peptidomimetics are also useful in the present invention. For a general review, see, Spatola, A. F., in CHEMISTRY AND BIOCHEMISTRY OF AMINO ACIDS, PEPTIDES AND PROTEINS, B. Weinstein, eds., Marcel Dekker, New York, p. 267 (1983).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid but, which functions in a manner similar to a naturally occurring amino acid.

The term "biomolecule" or "bioorganic molecule" refers to an organic molecule typically made by living organisms. This includes, for example, molecules comprising nucleotides, amino acids, sugars, fatty acids, steroids, nucleic acids, polypeptides, peptides, peptide fragments, carbohydrates, lipids, and combinations of these (e.g., glycoproteins, ribonucleoproteins, lipoproteins, or the like).

The term "biological material" refers to any material derived from an organism, organ, tissue, cell or virus. This includes biological fluids such as saliva, blood, urine, lymphatic fluid, prostatic or seminal fluid, milk, etc., as well as extracts of any of these, e.g., cell extracts, cell culture media, fractionated samples, or the like.

"Principal Component Analysis (PCA)" as used herein refers to a mathematical manipulation of a data matrix where the goal is to represent the variation present in many variables using a small number of factors. A new row space is constructed in which to plot the samples by redefining the axes using factors rather than the original measurement variables. These new axes, referred to as factors or principal components (PCs), allow the analyst to probe matrices with many variables and to view the true multivariate nature of data in a relatively small number of dimensions."from K. S. Beebe, R. J. Pell, and M. B. Seasholtz Chemometrics: a practical guide, John Wiley & Sons: New York. 1998, 81-82. The first principal component (PC1) explains the maximum amount of variation possible in the data set in one direction: it lies in the direction of maximum spread of data points. The second principal component (PC2), defined as orthogonal to (and independent from) the first, explains the maximum variation possible using the remaining variations not explained in PC1. Each sample will have one co-ordinate (called a score) along each of the new PCs. Therefore, the sample can be located on a 2-dimensional PC Score Plot using the two co-ordinates of the two selected PCs. Consider a data set comprised of 30 samples, 3 each from ten groups (such as ten different bacterial strains), in which each sample is represented by 800 original measurement variables (such as m/z units in a mass spectrum). Depending on the inherent dimensionality of the set, it would be possible to calculate up to 30 PCs. In all likelihood, not all of these 30 would represent statistically significant variations. The dimensionality required to represent the data can be further reduced by calculating Canonical Variates (CVs, described above). In this calculation some of the statistically insignificant variation ("noise") can be eliminated by using fewer than the 30 PCs. For mass spectral data sets one typically uses enough PCs to account for 85-99% of the original variance.

"Coherent Database" refers to a database containing spectra of known analytes, which can be used to identify the analytes. Additional spectra of analytes may be added to the database, even though they are not measured under identical instrumental and environmental conditions. Spectra added to such a database are optionally algorithmically transformed to appear as they would have if acquired under the standard instrumental and environmental conditions used for the first entries. Therefore, the data base remains "coherent" even as it grows.

"Between-sessions drift" refers to drift due to changes in either instrumental or environmental factors that occur, for example, because of changes in the operating parameters of an instrument when it is either restarted or re-calibrated or when there are changes in the growth medium used to culture a sample of an analyte. This term is for drift occurring between separate data gathering events.

"Within-session drift" is drift due to changes in an instrument's sensitivity and resolution as the instrument is continually run in a single data gathering event. This term includes drift due to the electronics of an instrument as a function of their temperature and due to contamination of instrumental components during a data-gathering event.

"Microorganism," as used herein includes bacteria (e.g. gram positive and gram negative cocci and gram positive and gram negative bacilli, mycoplasmas, rickettsias, actinomycetes negative eubacteria that have cell walls, gram positive eubacteria that have cell walls, eubacteria lacking cell walls, and archaeobacteria), fungi (fungi, yeasts, molds), and protozoans (amoebae, flagellates, ciliates, and sporozoans), viruses (naked viruses, enveloped viruses), and prions. See, for example, Bergey's Manual of Determinative Bacteriology, 9th ed., Williams and Wilkins, Baltimore, Md., 1994).

As used herein, "microorganism of interest" refers to a microorganism for which an identity (such as its genus, species, or strain) has not yet been established but for which this information is desired. An example of a microorganism of interest is a pathogen isolated from a subject for whom a microbiological diagnosis is desired to initiate therapy. In other embodiments, the microorganism of interest is a microorganism for which an identity has been established, but for which a relationship to other microorganisms has not yet been established. An example of such a relationship is whether the microorganism is of the same genus, species, or strain as another microorganism.

"Water loss" refers to rearrangements in which covalently-bound hydroxyl groups combine with a nearby hydrogen atom to form water (lost) and a C—C double bond in the observable ion during mass spectrometry. During "water loss", there is not any water per se in the molecule, but one still observes what appears to be loss of water molecules (18) in the spectra.

"Solvent interaction products" refer to any solvent molecule that is associated with a fragment in mass spectrometry. Thus, for example, bovine insulin may become associate with various numbers of fragments arising from Schiff base reactions between the analyte and acetone in a sample, as shown herein.

The Method

As discussed above, the invention provides a method of correcting spectral data for drift and other factors that lead to irreproducibility between spectra of similar samples. The method is applicable to samples that include any mixture of chemical and/or biological species. In the first step, the mass spectral data is deconvoluted by combining data from a set of peaks of a mass spectrum of the sample. The set of peaks may represent different charge states of a molecular fragment of a component of said sample, different metal adducts of a molecular fragment of a component of said sample, different water loss of a molecular fragment of a component of said sample, different solvent interaction products of a molecular fragment of a component of said sample, different isotopes from a molecular fragment of a component of said sample, or other chemical interactions that may occur during mass spectrometry to form multiple, predictable peaks representing a single molecular fragment. Each different charge state, metal adduct, solvent niteraction product, or isotope of molecular fragment gives rise to a unique peak in the mass spectrum, e.g., corresponding to that charge state of the fragment. Thus, for example, for a single molecular fragment, peaks arise for each singly and multiply charged state of the fragment. Moreover, metal ion and other adducts of the different charge states of individual fragments are commonly formed during the acquisition of the mass spectrum.

A representative deconvolution algorithm combines the Y-axis data, i.e., peak height, for two or more determinable charge states of a plurality of fragments originating from a particular sample. The algorithm results in the formation of a single peak that encompasses the combined determinable peaks originating from the charge states of a particular fragment.

The algorithm also optionally combines Y-axis data for two or more determinable metal ion and other adduct peaks originating from a molecular fragment detected by the mass spectrometer. Thus, there is produced a single peak corresponding to the combined determinable metal ion and other adduct of a particular fragment.

In yet another embodiment, the algorithm combines Y-axis data from two or more charge states of a fragment and the various metal ion and other adducts of the same fragment. In this embodiment, a single peak is produced that is representative of the combined determinable charge state and metal ion or other adduct of a particular fragment. The peaks can be combined "manually" or a computer algorithm can be used. Whether performed manually or using an algorithm, combining the peaks generally relies on the initial determination of sets of peaks that are small integer multiples or dividends of each other: peaks meeting one or both of these criteria are assumed to represent different charge states of the same molecular fragment.

The determination of the charge state corresponding to the various peaks provides a basis for estimating the position in the spectrum of the adducted derivatives. For example, sodium adducts of singly charged adducts appear 22 atomic mass units higher than the non-adducted fragment. Similarly, the sodium adducts of a doubly charged ion appear 11 atomic mass units higher than the non-adducted ion. In one embodiment, intensity observed at a mass 22 atomic mass units higher than each singly charged ion, 11 atomic mass units higher than each doubly charged ion and 7 ⅓ higher than each triply charged ion are combined with the intensity.

When metal ion adducts are formed, the invention provides an advantage by collapsing the distribution of the adducts due to isotopes of the metal ion into a single peak attributable to a unique fragment. The formation of predictable and regularly spaced peaks attributable to metal ion adducts also aids in assigning the charge state of a fragment in low resolution mass spectrometric modalities in which the spacing of the $^{13}C$ isotope peaks cannot be reliably determined.

Other adducts may be formed during acquisition of a spectrum and the invention provides similar methods for combining the intensity data from peaks arising from the same fragment. For example, in negative ion spectrometry, an acid adduct is sometimes formed from trifluoroacetic acid (TFA) or other organic acid (e.g., formate) added to the analyte to control the pH. In certain embodiments, organic solvent, e.g., acetone adducts are formed and the invention provides a similar method for combining the intensity data from the acetone adducts with the intensity data from the fragment and other adducts of the fragment. In an exemplary embodiment, the intensity data from peaks for adducts, such as the acetone fragment adduct, are not combined with other intensity data from other adducts of the fragment.

The present invention also provides a method for identifying an analyte by comparing a mass spectrum of the analyte, deconvoluted as described above, with a library reference set of mass spectra acquired from samples of known identity. The library data is generally deconvoluted using a method similar to that used to process the experimental data. Library searching techniques are commonly employed to assist and expedite the identification of spectra from unknown compounds. Typical library searching techniques consist of matching an unknown spectrum with entries in a spectral reference library. Analytes in the library that have similar spectra to the unknown can be tabulated according to a numerical similarity index generated by a statistical algorithm. Other methods of unknown identification include submission of its spectrum to an artificial neural network model trained on all or a subset of the library spectra.

In addition to combining the peaks originating from a particular molecular fragment, the invention further includes performing the combining operation on other sets of peaks arising from different molecular fragments. Thus, the deconvoluted spectrum optionally includes two or more peaks, each peak being produced by combining the data from a set of determinable peaks arising from a unique molecular fragment. As set forth above, the determinable peaks of the raw spectrum can represent different charge states or different adducts of a molecular fragment, thus, the combined peaks of the deconvoluted spectrum can include data representative of the charge states, the adducts or a combination thereof.

In addition to combining the mass data (m/z) for a set of peaks representing a molecular fragment, the method of the invention also combines the Y-axis data for each of the peaks so combined. The Y-axis data, or peak height, is generally related to the intensity of the peak.

The Sample

The present invention is of use to identify or quantify one or more components of a complex mixture or to characterize the mixture as a whole. The versatility of the present method allows its use without limitation to any mixture from any source. Representative samples with which the method can be practiced include chemical mixtures, including biomolecules. The method is of use to analyze mixtures of biomolecules isolated from microorganisms, e.g., viruses, bacteria, protozoa, prions, fungi, mycobacterium, etc. and from higher organisms, e.g., plants, fish, birds, mammals, insects, etc. The method can also be practiced with cellular extracts. The method is also applicable to whole cells, cell lysates, tissues, proteins, peptides, amino acids, nucleic acids, saccharides and the like.

The method is also of use to monitor changes in biochemical pathways. For example, the method provides a statistically robust platform from which to detect differential expression of proteins. Thus, in one embodiment, the method is used to monitor differential protein expression, e.g., on a gene chip, as a function of disease state (e.g., the presence or absence or stage of a cancer ), demographics, prognosis, or treatment regimen or progress.

The method described herein may also be used to identify analytes in other complex mixtures (besides microorganisms) that contain peptides or other species that form multiply-charged species. One example of such a complex mixture is blood, which contains the hemoglobin protein. Hemoglobin is known to form multiply-charged species quite readily upon MALDI analyses. The collapsing of the hemoglobin and other possible multiply-charged species into one molecule-specific signal facilitates the identification of analytes in blood. Such rapid blood screening by MALDI is useful to rapidly identify toxins thus enabling a more rapid treatment (e.g., antidote administration) of a subject.

In an exemplary embodiment, the method is used to identify and characterize a microorganism of interest in a sample and the mass spectrum includes a pattern of peaks that is representative of the microrganism. This embodiment is of use for detecting and characterizing infectious agents in patients, food, water or in other components of the environment. The invention also may be practiced using biological materials that are derived from microorganisms. Examples of biological materials derived from microorganisms include, but are not limited to, extracts, lysates, fractions, and organelles. Organelles include nuclei, nucleoli, mitochondria, endosomes, the Golgi apparatus, peroxisomes, lysosomes, endoplasmic reticulum, chloroplasts, cytoskeletal networks, nuclear matrix, nuclear lamina, axons, dendritic processes, membranes. Extracts and lysates may include nuclear extracts, organelle extracts and fractions thereof, whole cell extracts, tissue homogenates, and cytosol. Biological materials also may include heterogeneous macromolecular assemblies, such as ribosomes, spliceosomes, nuclear pores, DNA polymerase complexes, and RNA polymerase complexes.

Of particular note is the use of the method to detect agents of war or terror. The threat from biological weapons as tools of modern warfare and urban terrorism is increasing. Development of early detection, strain-level characterization, counter measures, and remediation technology is a high priority in many military, government and private laboratories around the world. Biological warfare (BW) agents of critical concern are bacterial spores, such as *Bacillus anthracis* (anthrax), *Clostridium tetani* (tetanus), and *Clostridium botulinum* (botulism).

Several nations and terrorist groups have or are believed to have the capability to produce chemical or biological weapons ("CBWs"). Moreover, recent events indicate that certain nations and terrorist groups are willing to use CBWs. One type of CBW that is of particular concern are viruses. Characteristics of the types of viruses that are believed to be particularly suitable for use in warfare and terrorist activities are: (1) a relatively short incubation period; (2) debilitating or deadly effects; and/or (3) communicability. Among the types of viruses that exhibit some or all of these characteristics are smallpox, viral encephalitides and viral hemorrhagic fevers. The possibility of viral agents being used against military personnel in a warfare situation or against a civilian population in a terrorist attack has created the need for rapid identification of the presence or likely presence of viral agents so that countermeasures can be taken to minimize the effects upon the target population.

The method provides for the detection and analysis of mass spectral features that are characteristic of a particular microorganism and the use of these features to identify the microorganism. The mass spectral features are of use to provide a measure of the presence or absence, absolute or relative level, subcellular location or distribution, frequency, integrity, appearance, activity, partnership, and/or any other detectable feature of any component(s) or structure(s) that may be present in, on, and/or near a microorganism of interest and/or microorganism-analysis materials. Components may include small molecules, such as nucleotides and their metabolites, e.g., ATP, ADP, AMP, cAMP, cGMP, and coenzyme A; sugars and their metabolites; amino acids and their metabolites; lipids and their metabolites, including phospholipids, glycolipids, sphingolipids, triglycerides, cholesterol, steroids, isoprenoids, and fatty acids; and ions, such as calcium, sodium, magnesium, potassium, and chloride, among others. Components also may include macromolecules such as deoxyribonucleic acid (DNA), including genomic DNA, mitochondrial DNA, plasmid DNA, double minute minichromosome DNA, viral DNA, transfected DNA, or other foreign or endogenous DNA sequences; ribonucleic acid (RNA), including ribosomal RNA, transfer RNA, messenger RNA, catalytic RNA, structural RNA, small nuclear RNAs, and antisense RNA; proteins, including peptides and specific covalently modified protein derivatives, such as phosphoproteins and glycoproteins; and polysaccharides, including glycogen and cellulose.

DNA-Related Microorganism Characteristics

Peaks in the mass spectrum arising from DNA provide a microorganism characteristic that can be used to identify the microorganism from which the DNA originated. The DNA-related characteristic may include total DNA; total genomic DNA; total mitochondrial or other organellar DNA; frequency of double minute chromosomes; frequency, subnuclear/subcellular distribution, or integrity of a chromosome or set of chromosomes; frequency, subcellular distribution, or integrity of a chromosomal region, where the chromosomal region is selected from a centromere, heterochromatin, centromeric heterochromatin, euchromatin, a triple helix, methylated sequences, a telomere, a repetitive sequence, a gene, an exon of a gene, an intron of a gene, a promoter or enhancer of a gene, an insulator of a gene, a 5' untranslated region of a gene, a 3' untranslated region of a gene, a nuclease hypersensitive site, an active transposon, an inactive transposon, a locus control region, a matrix attachment region, or other chromosomal region with known or unknown function. In addition, a DNA-related cell characteristic may include the frequency, subcellular distribution, or integrity of a foreign DNA sequence introduced naturally or artificially.

DNA-related cell characteristics can also provide information about the microorganism's stage of development or life cycle. For example, peaks arising in the spectrum from total nuclear DNA may provide a measure of the fraction of cells that have apoptosed. In addition, peaks arising from total nuclear DNA may provide an indication of ploidy, frequency of mitotic cells, overall nuclear morphology, and thus the state, health, and mitotic index of the cells. Peaks arising from total DNA also may provide an indication of the ability of a modulator or cell-analysis material to alter progression through the cell cycle, including defects in cell cycle checkpoints.

RNA-Related Microorganism Characteristics

Peaks attributable to RNA can also provide information about a microorganism characteristic that is useful to identify or characterize the microorganism. For example, RNA-derived spectral features may be useful to measure overall gene activity, transcriptional activity of a specific gene or reporter, and/or abundance or subcellular distribution of structural or catalytic RNAs, including those involved in protein synthesis and RNA splicing. For example, the presence or absence of an RNA may provide an indication of the expression level of a cellular, viral, or transfected gene. Furthermore, peaks arising from aberrant RNA transcripts, may provide a cell characteristic. In this case, the aberrant transcripts provide a measure of gene mutation or rearrangement, or information regarding a defect or error in splicing the primary RNA transcript to a messenger RNA.

Protein-Related Microorganism Characteristics

Spectral data that corresponds to the presence or absence, level, modification, subcellular location or distribution, and/or functional property of a protein also is of use as an identifying microorganism characteristic. For example, peaks attributable to a specific protein or set of proteins are useful to provide an indication of microorganism identity, species origin, developmental stage, transformation state, position in the cell cycle, growth state, status of a given signal transduction pathway, initiation of a cellular program such as heat shock, a checkpoint, or apoptosis; drug sensitivity or effectiveness; or use or integrity of a given transport pathway, among others. Furthermore, data from proteins that are resident in a distinct subcellular region, such as an organelle, provides information about the organelle, a disease state, and/or other aspects of cellular structure or function.

Lipid-Related Microorganism Characteristics

Peaks arising from lipid components of the microorganism are indicative of the presence, level, subcellular distribution, modification, partnership, and/or other properties of lipids that are of use to identify the microorganism. Lipids generally play diverse roles in microorganisms at membranes, in metabolism, as signaling molecules, and so on. For example, phosphatidylinositol-3-phosphate (PtIns3P) has a fundamental role both in regulating intracellular trafficking and in various signal transduction pathways. Other phosphoinositides, such as PtIns3,4P, PtIns3,5P, and PtIns4P, also appear to play fundamental roles in regulating cell function. An analysis of these and many other lipids is of use in providing information relevant to the identity of the microorganism.

Sample Preparation

The samples analyzed by the method of the invention can be analyzed directly in the form in which they are sampled, or they are optionally submitted to one or more procedures to improve the sample's properties. Exemplary procedures include sample clean up, concentration, culture of microorganisms in the sample and the like.

By way of example, sample preparation will be described with reference to bacteria as a representative biological agent. It will be understood that the procedures described are also applicable to a wide range of other chemical and biological agents including viruses, mycoplasmas, yeasts, oocysts, toxins, prions, and other infectious and non-infectious microorganisms. The invention is especially suitable for the identification of infectious biological agents and protein toxins, and will be described in this context.

Typically, samples containing bacteria can be directly subjected to mass spectrometric analysis using art-recognized methods, although the presence of contaminants, ionizable impurities and non-polar detergents, can undesirably suppress ionization efficiency under the soft-ionization conditions, e.g., ESI and MALDI. Thus, in an exemplary embodiment, contaminants are removed, improving the sensitivity of the method and the reliability of the identification of the biological agents while usefully extending the operating life of the spectrometer.

Standard, well known techniques for purification of mixtures are of use in practicing the present invention. For example, column chromatography, ion exchange chromatography, or membrane filtration can be used. In an exemplary embodiment the sample is cleaned up using membrane filtration, such as reverse osmosis. For instance, membrane filtration wherein the membranes have molecular weight cutoff of about 3000 to about 10,000 can be used to remove small molecules, culture media constituents and proteins moderately sized proteins. Nanofiltration or reverse osmosis can then be used to remove salts and/or purify the microorganism (see, e.g., WO 98/15581). Nanofilter membranes are a class of reverse osmosis membranes which pass monovalent salts but retain polyvalent salts and uncharged solutes larger than about 100 to about 4,000 Daltons, depending upon the membrane used. Thus, in a typical application, the microorganism and macromolecules derived therefrom will be retained in the membrane and contaminating salts and small molecules will pass through.

The microorganism may be freed from particulate debris, e.g., host cells or lysed fragments by centrifugation or ultrafiltration. When the sample is dissolved or suspended in an excess of fluid, it may be concentrated with a commercially available concentration filter. The microorganism is optionally separated from impurities by one or more steps selected from immunoaffinity chromatography, field flow fractionation (FFF), ion-exchange column fractionation (e.g., on diethylaminoethyl (DEAE) or matrices containing carboxymethyl or sulfopropyl groups), chromatography on Blue-Sepharose, CM Blue-Sepharose, MONO-Q, MONO-S, lentil lectin-Sepharose, WGA-Sepharose, Con A-Sepharose, Ether Toyopearl, Butyl Toyopearl, Phenyl Toyopearl, or protein A Sepharose, SDS-PAGE chromatography, silica chromatography, chromatofocusing, reverse phase HPLC (e.g., silica gel with appended aliphatic groups), gel filtration using, e.g., Sephadex molecular sieve or size-exclusion chromatography, chromatography on columns that selectively bind the polypeptide, and ethanol or ammonium sulfate precipitation.

A protease inhibitor, e.g., methylsulfonylfluoride (PMSF) may be included in any of the foregoing steps to inhibit proteolysis and antibiotics may be included to prevent the growth of adventitious contaminants.

In another embodiment, supernatants from systems which produce the microorganisms of the invention are first concentrated using a commercially available protein concentration filter, for example, an Amicon or Millipore Pellicon ultrafiltration unit. Following the concentration step, the concentrate may be applied to a suitable purification matrix. For example, a suitable affinity matrix may comprise a ligand for a cell surface receptor on the microorganism, a lectin or antibody molecule bound to a suitable support. Alternatively, an anion-exchange resin may be employed, for example, a matrix or substrate having pendant DEAE groups. Suitable matrices include acrylamide, agarose, dextran, cellulose, or other types commonly employed in protein purification. Alternatively, a cation-exchange step may be employed. Suitable cation exchangers include various insoluble matrices comprising sulfopropyl or carboxymethyl groups.

In another embodiment of the present invention, suspensions containing biological agents including bacteria and the like, are treated to release biomarkers from the cellular constructs of the biological agents. The released biomarkers are concentrated and purified, e.g., by ultrafiltration to yield a sample substantially free from undesirable contaminants. The components of the processed sample are optionally passed through chromatographic means such as nanocolumns or microcolumns comprising reverse phase sorbents, for example, to separate the biomarkers into discrete fractions according to size, charge, solubility, and the like. The separated biomarkers are introduced into a mass spectrometer to acquire the corresponding mass spectral profile or data.

In another embodiment, a sample comprising centrifuged cell lysate is loaded into a cartridge adapted for trapping proteins to isolate the protein biomarkers from the undesirable contaminants. The trapped proteins are then optionally delivered onto a nano reverse phase HPLC column, followed by separation of the mixture through liquid chromatography. The separated components are then introduced into a spectrometer for analysis. Alternatively, the sample is desorbed from the protein-trapping cartridge through a cartridge containing a protease such as trypsin to promote proteolytic digestion of proteins to yield peptide fragments. The resulting peptide fragments are then further cleaned and concentrated to remove ionizable impurities, salts, detergents, buffers, and the like, separated by the chromatographic means, and analyzed by a tandem mass spectrometer to obtain the molecular mass and peptide sequencing information of the corresponding protein biomarkers released. Each of the sample processing components of the present invention is fluidly connected to one another through fluid conveying lines and switched by multi-port valve units for permitting passage of the sample to each component.

Samples containing microorganisms are also optionally submitted to conditions appropriate to culture the microorganism. Culture of the microorganism may be performed solely to increase available sample microorganism, or it can be of use to provide a sample that has been grown on a known or standardized medium. In an exemplary embodiment, the microorganism is cultured in the same medium as that which was used to culture one or more of the microorganisms whose spectra make up the library reference set. At the completion of cell culture, any portion of the culture medium or cell is optionally submitted to one or more of the above-described clean up procedures.

In an exemplary embodiment, a microorganism is cultured on a generic non-selective growth medium such as Tryptic Soy Agar (TSA). Other examples of generic non-selective growth media are Luria-Bertani and blood agar. A generic non-selective growth medium such as TSA, TSB, universal pre-enrichment broth, brain-heart-infusion broth, or 2× Yeast Tryptone broth, that supports the growth of numerous types of microorganisms, may be utilized during construction of a library database that includes many different types of microorganisms. However, in outbreak situations the first cultures are commonly obtained on selective growth media for the anticipated species (based on epidemiology and symptomology) in order to reduce the microbial background of irrelevant species. For example, if outbreak symptoms suggest Vibrio contamination of seafood (e.g. severe watery diarrhea and vomiting following ingestion of seafood), a sample of the seafood might be introduced into a Vibrio-selective growth medium such as thiosulfate citrate bile source (TCBS) to provide a first culture.

In another exemplary embodiment, the sample preparation includes introducing one or more species to the sample that aid in the production of a spectrum of recognizable pattern. For example, one can add sodium, potassium or another ion to the mixture to enhance the formation of adducts or to change their population or the relative proportion of adducts.

Data Acquisition

As discussed herein, the invention utilizes mass spectra to identify one or more components of an analyte. In an exemplary embodiment, the present invention makes use of one or more "soft ionization" mass spectrometric techniques to prepare a spectrum of a sample. The so-called "soft ionization" mass spectrometric methods, including Matrix-Assisted Laser Desorption/Ionization (MALDI), Surface-Enhanced Laser Desorption/Ionization (SELDI), and ElectroSpray Ionization (ESI), allow intact ionization, detection and mass determination of large molecules, i.e., well exceeding 300 kDa in mass (Fenn et al., *Science* 246: 64-71 (1989); Karas and Hillenkamp, *Anal. Chem.* 60: 2299-3001 (1988)). MALDI mass spectrometry (MALDI-MS; reviewed in Nordhoff et al., *Mass Spectrom. Rev.* 15: 67-138 (1997)) and ESI-MS have been used to analyze biomolecules that are difficult to volatilize and, therefore, there has been an upper mass limit for clear and accurate resolution. The techniques are appropriate for the desorption of large biomolecules even in the megaDalton mass range (Ferstenau and Benner, *Rapid Commun. Mass Spectrom.* 9: 1528-1538 (1995); Chen et al., *Anal. Chem.* 67: 1159-1163 (1995)).

Also of use are techniques such as Fast Atom Bombardment, and plasma desorption. The choice of soft ionization technique is not crucial to the invention and those of skill are readily able to modify the present method for the acquisition and analysis of data from any such technique.

The MALDI-MS technique is based on the discovery in the late 1980's that desorption/ionization of large, nonvolatile molecules such as proteins and the like can be made when a sample of such molecules is irradiated after being co-deposited with a large molar excess of an energy-absorbing "matrix" material, even though the molecule of interest may not strongly absorb at the wavelength of the laser radiation. In these methods, a laser is used to strike the biopolymer/matrix mixture, which is crystallized on a probe tip, thereby effecting desorption and ionization of the biopolymer. Exemplary matrices include α-cyano-4-hydroxycinnamic acid (CHCA), sinapinic acid (SA), 2-(4-hydroxyphenylazo)benzoic acid (HABA), succinic acid, 2,6-dihydroxyacetophenone, ferulic acid, caffeic acid, glycerol, 4-nitroaniline, 2,4,6-trihydroxyacetophenone (THAP), 3-hydroxypicolinic acid (HPA), anthranilic acid, nicotinic acid, salicylamide, trans-3-indoleacrylic acid (IAA), dithranol (DIT), 2,5-dihydroxybenzoic acid (DHB) and 1-isoquinolinol.

The abrupt energy absorption initiates a phase change in a microvolume of the absorbing sample from a solid to a gas while also inducing ionization of the molecule of the sample. The ionized molecules are accelerated toward a detector through a flight tube. Since all ions receive the same amount of energy, the time required for ions to travel the length of the flight tube is dependent on their mass/charge ratio. Thus low-mass ions have a shorter time of flight (TOF) than heavier molecules of equal charge. Detailed descriptions of the MALDI-TOF-MS technique and its applications may be found in review articles written by E. J. Zaluzec et al. (*Protein Expression and Purification,* 6: 109-23 (1995)) and D. J. Harvey (*Journal of Chromatography A,* 720: 429-4446 (1996)), and in U.S. Pat. No. 6,177,266.

When a matrix is utilized, substantially any method of contacting the matrix and the sample is of use in the invention. For example, the matrix can be applied to the sample as a drop or the sample and the matrix are optionally mixed together in a vessel prior to the application of the resulting mixture to the probe. The matrix is optionally rapidly dried. Also of use is any method that can "seed" uniform crystal formation or co-crystallization of the matrix and analyte components. In another exemplary embodiment, a mixture of the matrix material and the sample is prepared and then the mixture is dispersed between two layers of the matrix material. In yet another exemplary embodiment, the method utilizes a dried mixture of a matrix material and the sample in which the mixture is exposed to ultrasound during drying.

The invention also provides for the use of any matrix material or combination of materials that gives rise to a spectrum having the desired characteristics. For example, in MALDI and other soft-ionization techniques, when metal salts are present, the matrix is preferably selected from non-protonating matrices, leading to the production of positively-charged chemical markers. The chemical markers are produced independent of any inherent Lewis acidity or basicity of the mixture components. The matrix can also include organic solvents, e.g., acetone, that produce mass spectral adducts or reaction products diagnostic of each chemical marker's charge state. In yet another exemplary embodiment, the matrix components are selected such that identifiable acid adducts or products are interpretable in negative ion spectra.

Aside from the means for desorption/ionization, the ESI-MS technique is similar to the MALDI-MS technique in principle. In ESI, a dilute solution of an analyte containing large, nonvolatile molecules such as proteins and the like is slowly supplied through a short length of capillary tubing. The capillary tubing is held at a few kilovolts with respect to the counter electrode, positioned about a centimeter away. The strong electric field at the end of the capillary tubing draws the solution into a cone-shaped form, and at the tip of the cone the solution is nebulized into small charged droplets. As the charged droplets travel towards the counter electrode, the solvent evaporates, thus ultimately yielding molecular ions. The ions are drawn into the vacuum chamber through a small aperture or another piece of capillary tubing, which is usually heated to ensure that the ions are completely desolvated. The molecular ions are then extracted into a mass spectrometer for analysis.

In both techniques, ionization is a critical event in mass spectrometry where the masses of the ionized particles can be accurately measured by the mass spectrometer. The mass spectrometer is a highly sensitive analysis instrument which provides the user with information on the molecular weight and structure of organic compounds and the like. Once the mass of the ion is known, the chemical composition and structure can further be determined through the use of tandem mass spectrometric techniques as known in the art. The utilization of ESI and MALDI when combined with mass spectrometry provides accurate analysis of large biological molecules such as proteins and DNA. The detection limits with mass spectrometry, especially MALDI, depend largely on concentrating the sample and reducing the volume thereof. Sensitivity will increase as ultramicro methods for concentrating and transferring ever smaller-volume samples are developed.

As noted above, the biological agent can be unambiguously identified through the comparison of its deconvoluted mass spectrum with a library reference set of deconvoluted mass spectra of samples of known identity. Direct MALDI-MS or liquid chromatographic/microspray-MS analysis of the intact microorganism generates a mass spectral profile that is representative of the individual microorganism. The mass spectra for each bacterium of a particular genus, species, and strain are unique for both pathogenic and non-pathogenic biological agents alike. Thus, the mass spectra provide a tool for distinguishing between pathogenic and non-pathogenic microorganisms. Samples containing multiple microorganisms of differing genus, species, and strain, and/or protein toxins may also be analyzed by employing the present invention. The invention is also of use for identifying biological agents of viral origins.

The mass spectra can be acquired using either or both negative ion mass spectrometry and/or positive ion mass spectrometry. When both methods are utilized, the composite method can involve producing a composite spectrum, part of the X-axis comprising positive ions and another part, negative ions in which the assigned "mass" has been transposed into an unused portion of the positive ion mass range. Alternatively, both positive and negative spectra can be used together by normalization followed by addition of the two spectra onto the same region of the X-axis.

The present invention also optionally incorporates strategies used during spectral acquisition that increase the ability of the one or more instruments to produce library searchable, information rich, and reproducible patterns from the mass spectra. For example, for MALDI and laser desorption mass spectrometry, direct or functional measurement of laser intensity at the sample is of use to allow the spectrum obtained to be reproduced at another time. In an exemplary embodiment, direct measurement is achieved by using a photometer. In another embodiment, the laser intensity is indirectly measured by generating a laser intensity vs. total ion intensity plot, allowing the analyst to determine the intensity of the laser that produced a particular and distinguishable total ion intensity, such as the highest intensity.

In yet a further exemplary embodiment utilizing MALDI, spectra are acquired for a series of samples of the same analyte utilizing different matrices with different ionization characteristics. As in the case of positive and negative ions discussed above, use of multiple spectra can be embodied by composition along a single axis or by normalized averaging/addition.

Data Processing

The present invention provides a robust data processing method that processes data from mass spectra and reproducibly identifies one or more components of a mixture. The method compensates for instrument drift within an individual run or between runs. Moreover, the method of the invention allows for the comparison of data acquired from different instruments and data acquired under different conditions.

The invention is illustrated by reference to charge state, adduct, solvent interaction product, isotope or other deconvolution, which provides numerous advantages including, but not limited to, reproducible intensity data and ease of pattern recognition. The invention also allows for the use of artificial intelligence pattern recognition methods and combinations of artificial intelligence methods with multi-linear statistical techniques, simplifying the construction of artificial neural networks (ANNs) and other computationally intensive pattern recognition schemes. For example, the number of ANN nodes and the calculations necessary in model development is an exponential function of the number of peaks in the spectrum. Processes that reduce the number of peaks greatly simplify the calculations needed to utilize the data.

After acquisition of the mass spectrum, the data contained in the spectrum is deconvoluted by combining peaks attributable to different charge states and/or different adducts of a single molecular fragment. The deconvolution produces a simplified spectrum in which all peaks attributable to a single molecular fragment are displayed as a single peak and the intensities from the different charge states and/or adducts contribute in a rational manner to the total intensity at the nominal mass. By way of example, if the ion is singly charged, the sodium adduct appears in the spectrum at a position that corresponds to an ion 22 atomic mass units greater than the non-adducted ion. If the ion is singly-charged, the sodium adducts show at 22 atomic mass units higher than the protonated ion. If the ion is doubly charged, e.g., from a sodium ion and a proton, the adduct appears 11 atomic mass units higher than the doubly protonated ion. Thus, the present invention provides a method to deconvolute different charge states of a molecular fragment, metal ion adducts, solvent interaction products, isotopes or other chemical interactions that may occur during mass spectrometry to form multiple, predictable peaks representing a single molecular fragment. The relative positions of a series of adducts and charge states is readily determined by those of skill in the art.

In one embodiment, the intensity data from the peaks are simply combined such that there is a proportional contribution from the intensity of each peak combined. In another embodiment, if one knew that multiply charged species were harder to form, or were formed in lesser amounts, one might assign their contribution a greater weight to the sum whenever they appear. In another exemplary embodiment, one applies a mathematical function to the data, e.g., linear or exponential mass multiplier function to account and correct for factors such as ion reneutralization, leakage past or impact on the ion optics or intensities that are not linearly related to the size of the ion population for a particular ion, e.g., in a TOF the high mass ions may produce less signal per unit molar concentration than the low.

In addition to the charge state (or adduct, interaction products, isotopes, etc.) deconvolution method discussed above, data processing algorithms of use in the present invention also include post spectra acquisition strategies that allow the raw spectra to be converted into a form suitable for archival storage, analysis and mixture characterization. For example, small-integer mass products or dividends can be used to identify spectral peaks in the different charge states that represent the same component of the sample mixture. Moreover, the relationships between adduct ions or metal ion isotopes are of use to identify or confirm charge states for peaks in the mixture's raw spectra. One factor adding to the desirability of using metal ion adducts is that for a low mass resolution instrument, e.g. TOF, quadrupole, it is more feasible to confirm charge state assignments than attempt to distinguish peaks having only 1, ½, ⅓ atomic mass unit difference (for singly, doubly or triply charged species, respectively, from 13C isotopes, for example) mass differences.

Additionally, composite or summed spectra from different types of analyses can provide a pattern that is representative of one or more components of the mixture. Summed spectra optionally include spectra from different MALDI matrices, positive and negative ion spectra from the same analyte or the same sample of analyte, and spectra obtained from irradiation of the sample with different lasers, e.g, different wavelength, intensity, etc. In general, the composite and summed spectra will be total-intensity normalized, autoscaled or otherwise pre-processed so that each spectrum contributes equally to the resulting spectrum.

Database Construction

In an exemplary embodiment, the invention provides a library reference set of fingerprint spectra for species in a mixture and/or the mixture. Also provided are methods for querying the library to determine if the spectrum of an analyte is found in the library. Generally preferred are libraries that include spectral data that is processed or is amenable to processing by the method set forth above. An exemplary library includes spectra or spectral data that is charge state and/or adduct deconvoluted as described above. Such libraries may represent spectra from microorganisms, or tissue or cellular samples (e.g., biopsies) to monitor the presence or absence or progress (disease stage) of diseased (e.g., cancer) cells.

In an exemplary embodiment, the library includes spectra acquired from microorganisms. The microorganisms included in the databases are optionally classified into metabolic similarity groups according to the similarities in the differences they exhibit in their fingerprint spectra when cultured on different growth media. See, for example, Wilkes et al., *J. Am. Soc. Mass Spectrom.,* 13(7) 2002, 875-887; and Wilkes et al., commonly owned U.S. patent application Ser. No. 09/975,530, filed Oct. 10, 2001.

The library database can be consulted to identify an unknown microorganism. In an exemplary embodiment, the unknown microorganism is cultured on a test growth medium. A deconvoluted spectrum for the unknown microorganism is compared to a spectrum acquired from a known microorganism, which is optionally cultured on the test growth medium.

An exemplary library database of deconvoluted spectra for the identification or taxonomic classification of microorganisms is compiled using spectra for microorganisms grown on a selective or a generic non-selective growth medium such as Tryptic Soy Agar (TSA). Other examples of generic non-selective growth media are Luria-Bertani, blood agar, and 2× yeast tryptone broth. A generic non-selective growth medium such as TSA, that supports the growth of numerous types of microorganisms, may be utilized during construction of a library database that includes many different types of microorganisms. However, in outbreak situations the first cultures are commonly obtained on selective growth media for the anticipated species (based on epidemiology and symptomology) in order to reduce the microbial background of irrelevant species.

A coherent library database allows rapid identification of a microorganism by making it possible to identify a microorganism based upon its deconvoluted spectrum. For example, a microorganism grown on a Vibrio-selective growth medium such as TCBS can be identified by measuring its spectrum without having to re-grow the microorganism on the generic non-selective growth medium used for compilation of the library database. A coherent library database that makes this possible can be used in association with a mechanism for transforming the spectrum of a microorganism grown on a selective growth medium into an expected fingerprint spectrum of the microorganism if it were grown on the same generic non-selective growth medium used for compilation of the library database. Using a transformed spectrum, the library database may be consulted to identify the microorganism.

In exemplary embodiments, a coherent library database is assembled by identifying groups of microorganisms that have spectra that vary in parallel as a function of changes in growth media constituents (i.e. are metabolically similar).

Microorganisms may be grouped experimentally as follows. As set forth above, the microorganisms that are to be included in the library database are optionally grown both on a selective growth medium that supports their growth and a less-selective or generic growth medium used for compilation of the library database. Spectra for each microorganism grown on each growth medium are measured and deconvoluted. The deconvoluted spectra are analyzed using a pattern recognition program (e.g. RESolve, Colorado School of Mines, Golden, Colo.) to generate principal components and canonical variates of the data (see, for example, Computer Assisted Bacterial Systematics, Goodfellow et al, eds., Academic Press, London, 1985). Following such analysis, each spectrum may be represented as a point in multi-dimensional space, where the principal components or canonical variates are the axes of that space. If the microorganisms produce different biomolecules on the two growth media, their fingerprint spectra from the two media will be represented by two points separated in multidimensional space. A vector defined, for example, as connecting the point representing the selective medium fingerprint spectrum of a microorganism to the point representing its spectrum when grown on the less selective or generic library database medium may be determined for each microorganism. Similarities between the directions and the lengths of these vectors may be detected by pattern recognition and the microorganisms grouped according to the similarities of their vectors. Such methods may also be used to determine the presence or absence or stage of a disease, e.g., if the library contains spectra from samples from different types of stages of disease.

A quantitative measure of vector similarity is preferably based on the quality of the result: an identification using transformed spectra correctly assigns the highest probability of class identity to the proper library bacterium. For any database, a minimal standard of performance is that the unknown spectrum be most similar to that of the correct bacterium. Even for small databases of spectra obtained in a single session, probabilities of class membership vary a good deal from sample to sample: for good data, from 25% to 100% where other probabilities are near zero. Some groups of replicate spectra are tightly clustered and others more disbursed. Therefore, it is generally preferred that vector similarity be demonstrated by the quality of assignment that results from their use.

In an exemplary embodiment, during construction of the database, a large batch of generic non-selective growth medium such as TSA is obtained and preserved for future use as the library database growth medium so that as new microorganisms are isolated and become available they may be cultured and have their library database spectra determined. By using the same batch of growth medium for all database spectra, variations in the spectra due to differences in the nutrient profile between batches is eliminated. However, before entering each spectrum into the database, spectra using the standard TSA, even if obtained on different instruments or on the same, re-tuned instrument, are preferably normalized back to (arbitrarily specified) standard conditions using a spectral compensation algorithm that corrects for instrumental and other experimental drift.

More examples of spectra can be subsequently added to the database. For authenticated strains already in the database, new spectra that are to be added to the database are optionally transformed using the relationship between the new fingerprint spectra and the previously catalogued fingerprint spectra of the exact strain. New microorganisms, not already in the database, would be grown on the same agar and instrumental drift compensation (as tracked by strains already in the database and analyzed along with the new strains) would be the only correction necessary because, by using the same standard batch of growth medium, drift due to changes in the growth medium are avoided.

The disclosed methods may also be used to add new microorganisms to the library database even after the preserved batch of library database growth medium is exhausted. In this situation, compensation to the database conditions may be performed based on the spectra of metabolically similar microorganisms already in the database as follows. The new microorganism and a representative microorganism from each of the metabolically similar groups identified in the library database are grown both on a selective growth medium and the new batch of library database growth medium. Spectra are measured for each microorganism grown on the two growth media. The spectra are analyzed by pattern recognition to generate principal components and canonical variates. Vectors are determined between the spectra of each microorganism grown on the two growth media. The vector determined for a representative of a metabolically similar group within the library database is used as the vector for the new microorganism and so transforms the new microorganism's spectrum back to standard, library conditions. Once the most similar representative of a metabolically similar group of microorganisms is determined, its fingerprint spectrum from the new batch of library database growth medium is compared to its spectrum from the preserved batch of library database growth medium that is now exhausted. The differences between these two spectra are used to transform the spectrum of the new microorganism into an expected fingerprint spectrum of the new microorganism. The expected spectrum represents how the new microorganism's spectrum might have looked if it had been measured after growth on the preserved, but now exhausted, library database growth medium. This transformed spectrum then is entered into the library database as the new microorganism's library spectrum.

Different standard spectral databases may be assembled whenever there are major experimental variations. For example, a MALDI bacterial spectral library would be maintained separately from an EI/MS based library, even if microbial samples were cultured on the same TSA agar. The methods of algorithmic compensation work best in correcting for instrumental drift within and between sessions, for growth medium variations, and for instrument specific variations. Compensation may also be achieved for minor variations associated with different microbial growth times (24 hours versus 20 hours, for example), but optimal results are achieved with less extreme variations in sample growth time. It is believed that the correction algorithm would probably be inappropriately applied for significant ionization mode variations, such as for changing electrospray MS spectra into El MS spectra, to cite an extreme.

The libraries of use in the present invention can include any useful number of spectra. In one embodiment, the library includes from about 10 to 10,000 spectra of reference samples. In another exemplary embodiments, the library is includes from about 50 to 1000 spectra from reference samples.

Database Consultation

Unknown microorganisms may be identified using a library database of spectra, whether or not the unknown samples are cultured on the library database growth medium. The spectra are deconvoluted, and compared to spectra in the library database to identify the microorganism. This step can be done using RESolve, Statistica, Pirouette, or any other pattern recognition program, including an artificial neural network. The program makes a comparison between the pattern exhibited by the deconvoluted spectrum of the unknown and the patterns exhibited by spectra for known microorganisms that are stored in the library. The unknown microorganism may be identified as being of the same type as the known microorganism exhibiting the most similar database spectrum. Similarity may be judged, for example, by proximity of the spectra on a CV score plot if the number of possible identities has been reduced to 4 or 5 nearest neighbors. Alternatively, similarity may be judged by algebraic and statistical methods well known in the art and embodied as standard features in available software pattern recognition packages as predictions of the likelihood of class membership.

Pattern recognition programs useful for practicing the present invention are of two major types; statistical and artificial intelligence.

Statistical methods include Principal Component Analysis (PCA) and variations of PCA such as linear regression analysis, cluster analysis, canonical variates, and discriminant analysis, soft independent models of class analogy (SIMCA), expert systems, and auto spin (see, for example, Harrington, RESolve Software Manual, Colorado School of Mines, 1988, incorporated by reference). Other examples of statistical analysis software available for principal-component-based methods include SPSS (SPSS Inc., Chicago, Ill.), JMP (SAS Inc., Cary N.C.), Stata (Stata Inc., College Station, Tex.), SIRIUS (Pattern Recognition Systems Ltd., Bergen, Norway) and Cluster (available to run from entropy:~dblank/public_html/cluster).

Artificial intelligence methods include neural networks and fuzzy logic. Neural networks may be one-layer or multilayer in architecture (see, for example, Zupan and Gasteiger, Neural Networks for Chemists, VCH, 1993, incorporated herein by reference). Examples of one-layer networks include Hopfield networks, Adaptive Bidirectional Associative Memory (ABAM), and Kohonen Networks. Examples of Multilayer Networks include those that learn by counter-propagation and back-propagation of error. Artificial neural network software is available from, among other sources, Neurodimension, Inc., Gainesville, Fla. (Neurosolutions) and The Mathworks, Inc., Natick, Mass. (MATLAB Neural Network Toolbox).

Principal component analysis (PCA) and related techniques consist of a series of linear transformations of the original m-dimensional observation vector (e.g. the mass spectrum of microorganism consisting of the ion masses and intensities) into a new vector of principal components (or, for example, canonical variates), that is a vector in principal component factor space (or, for example, canonical variate factor space). Three consequences of this type of transformation are of importance in chemotaxonomic studies. First, although a maximum of m principal axes exist, it is generally possible to explain a major portion of the variance between microorganisms with fewer axes. Second, the principal axes are mutually orthogonal and hence the principal components are uncorrelated. This greatly reduces the number of parameters necessary to explain the relationships between samples. Third, the total variance of the samples is unchanged by the transformation to Principal Components. Similarly, for canonical variates, which are orthogonal linear combinations of the PCs, the total variance remaining in those PCs selected for use is unchanged by the transformation. In the CVs it is partitioned in such a way that variance between groups of samples is maximized and variance within groups of samples is minimized. Further discussion of this method and related methods may be found, for example, in Kramer, R., Chemometric Techniques for Quantitative Analysis, Marcel Dekker, Inc., 1998.

Score plots are a way of visualizing the results of PCA and related techniques such as CV analysis. A sample's PC or CV score is its co-ordinate in the direction in PC or CV space defined by that particular PC or CV. A 2-dimensional PC or CV score plot shows the location of each sample projected onto the plane of the selected pair of PCs or CVs. Since there are typically fewer CVs than PCs, a CV score plot will locate the samples with less of the variance remaining in other orthogonal dimensions. Therefore, compared to a PC score plot, a CV score plot generally gives a better representation of how similar or different sample spectra are from each other. If a set of spectra are compared which only include 3 different groups, the maximum number of CVs that can be calculated is 2. In that case, the 2_D score plot of CV1 vs. CV2 incorporates all of the available variance in a single view. It may be true that, with a few more groups in which the spectra vary in "parallel"—perhaps a total of 6 groups, that the first two CVs are also sufficient for comparing spectral variance as in the methods disclosed.

Principal Component Analysis (PCA) and variations of PCA such as linear regression analysis, cluster analysis, canonical variates, and discriminant analysis, soft independent models of class analogy (SIMCA), expert systems, and auto spin may be performed utilizing the statistical program, RESolve 1.2 (Colorado School of Mines). Further discussion of PCA and its variants may be found in Harrington, RESolve Software Manual, Colorado School of Mines, 1988, which is incorporated herein by reference.

The RESolve program compares a set of mass spectra to determine the class membership of any unknowns among them. For meaningful analysis, each known sample (from the library) is preferably represented by at least two and more preferably three spectral replicates, so that random variability can be assessed and the variance within classes can be calculated.

The individual mass spectra are compiled into a single "RESolve" file for comparison. During data pre-processing, selected ions can be deleted from the pattern definition. Each known spectrum is assigned a class membership using any number or letter other than zero, reserving zero for each of the unknown spectra. Although two spectra are assigned to the number zero, there is no assumption that they belong to the same category. The spectra are then normalized by total intensity to balance out differences in ion magnitude attributable to the number of cells analyzed. The process described leaves a set of spectra in which differences in ion abundance represent the metabolic capabilities of the bacterial cells, i.e., the spectra as modified are now suitable fingerprints that can be logically associated with sample identity.

After pre-processing, the pattern-recognition modeling commences. Using the modified spectra, up to 30 PCVs are calculated. The PCVs are linear combinations of the original mass/intensity pairs that comprise a mass spectrum. They are calculated in a ranked order, in which the first PCV contains weighted contributions explaining or representing the maximum variance in this particular spectral data set; the second PCV also contains weighted combinations of the remaining variance, and so on. Generally, one cannot estimate a priori how many PCVs represent statistically significant combinations of phenotypic information and how many represent random variability (chemical noise). For a data set containing 20 to 100 spectra, the analyst chooses about 10 PCVs and uses these to calculate a number of discriminant functions. The number of functions calculated necessarily equals one less than the number of classes (bacterial strain categories) in the data, N-1.

The group of N-1 discriminant functions is referred to as a model, which is optionally used to predict the identity of any new spectrum presented to it. It assigns a probability that the new spectrum belongs to one or to several of the identified classes. If the model contains poorly clustered groups, it is possible for an unknown to have a large probability of belonging to several groups. The probabilities do not add up to 100%.

The accuracy of a model always improves as more and more PCVs are used in model building. On score-plots, this fact is observed as tighter clusters for replicate analyses and more space between clusters. The apparent improvement can become a deceptive artifact as the model increasingly fits random data variations. (The model gives excellent results for the finite training set of spectra but incorrect identifications for new spectra.).

To avoid including random variations in the model, the optimal number of PCVs is chosen by a validation experiment. The RESolve program provides Leave-One-Out (LOO) cross-validation. In LOO, each spectrum from the original training set is removed from consideration while the model is rebuilt using all the other data and the same number of PCVs. Then the LOO model is consulted to classify the spectrum left out and the classification is either correct or incorrect. This process is repeated for each of the data points and results in global LOO cross-validation results expressed as a percentage of correct answers to the set of questions, "Which cluster is closest to this particular (removed) spectrum?" To find the best model, more (or fewer) than 10 PCVs are chosen, a model is built, and its LOO cross-validation percentage is determined. After checking results for the full range of PCVs used, the model with the highest LOO cross-validation percentage is considered best for the particular set of spectra.

The present invention also optionally utilizes a category-reduction strategy to reduce the number of identities for each unknown. The analyst chooses approximately 15 Principal Components of Variation (PCVs) and builds a discriminant function model for N spectra grouped into M classes. Normally the model is tested by leave-one-out (LOO) cross-validation. In LOO each spectrum is temporarily excluded from the test set, the model is rebuilt, and the new model classifies the excluded spectrum. To improve results, models can be built using a different number of PCVs, with results compared by LOO cross-validation. When doing category reduction, the analyst may not need to identify the optimal number of PCVs. Scores from a semi-optimized model can be plotted. By examining distances between an unknown and known samples, one can eliminate consideration of dissimilar categories. That is, one builds new comparison sets, called RESolve files, that include only categories closest to each unknown. The smaller data set can be optimized for the number of PCVs, as described above. Since the discriminant functions distinguish fewer categories, they do a better job of classification. The clusters are better separated, and LOO cross-validation results improve. (Note that in this process the original spectra generally remain unchanged; only the proportions of ion contributions to each discriminant function change.) The category-reduction strategy is particularly useful when the sample set includes a large number of strains from fairly similar categories.

Pattern recognition may be performed using multivariate methods, such as those performed by the programs above or by any number of artificial neural network techniques. Artificial neural network software is available from, among other sources, Neurodimension, Inc., Gainesville, Fla. (Neurosolutions) and The Mathworks, Inc., Natick, Mass. (MATLAB Neural Network Toolbox). Both PCR and PLS can reduce massive amounts of data into sets that can be readily managed for analysis. More importantly, when these methods are used to evaluate the spectra of mammalian cells, the techniques analyze entire regions of a spectrum and allow discrimination between the spectra of different groups of specimens.

Prior to the analysis of unknown samples, another set of spectra of the same materials are optionally used to validate and optimize the calibration. This second set of spectra enhance the prediction accuracy of the PCR or PLS model by determining the rank of the model. The optimal rank is determined from a range of ranks by comparing the PCR or PLS predictions with known diagnoses. Increasing or decreasing the rank from what was determined optimal can adversely affect the PLS or PCR predictions. For example, as the rank is gradually decreased from optimal to suboptimal, PCR or PLS would account for less and less variations in the calibration spectra. In contrast, a gradual increase in the rank beyond what was determined optimal would cause the PCR or PLS methodologies to model random variation rather than significant information in the calibration spectra.

Generally, the more spectra a reference set includes, the better is the model, and the better are the chances to account for batch to batch variations, baseline shifts and the nonlinearities that can arise due to instrument drifts or changes in the refractive index, etc. Errors due to poor sample handling and preparation, sample impurities, and operator mistakes can also be accounted for so long as the reference data render a true representation of the unknown samples.

Another advantage to using PCR and PLS analysis is that these methods measure the spectral noise level of unknown samples relative to the calibration spectra. Biological samples are subject to numerous sources of perturbations. Some of these perturbations drastically affect the quality of spectra, and adversely influence the results of an analysis. Consequently, it is preferred to distinguish between spectra that conform with the calibration spectra, and those that do not (e.g. the outlier samples). The F-ratio is a powerful tool in detecting conformity or a lack of fit of a spectrum (sample) to the calibration spectra. In general F-ratios considerably greater than those of the calibration indicate "lack of fit" and should be excluded from the analysis. The ability to exclude outlier samples adds to the robustness and reliability of PCR and PLS as it avoids the creation of a "diagnosis" from inferior and corrupted spectra. F-ratios can be calculated by the methods described in Haaland, et al., *Anal. Chem.* 60:1193-1202 (1988), and Cahn, et al., *Applied Spectroscopy* 42:865-872 (1988).

When discriminating between samples of different microorganisms, the biological materials no longer have known concentrations of constituents. As a result, the calibration spectra must determine the range of variation allowed for a sample to be classified as a member of that calibration, and should also include preprocessing algorithms to account for diversities in sample concentration. One normalization approach that aids in the discrimination of specimens is locating the maximum and minimum points in a spectral region, and rescaling the spectrum so that the minimum remains at 0.0, and the maximum at 1.0 absorbance or other unit. Another normalization procedure is to select a specific peak at a certain mass value of the spectrum, and relate all other peaks to the selected peak(s).

EXAMPLES

The following examples are offered to illustrate, but not to limit the claimed invention.

Example 1

This example demonstrates that different adducts may form in a MALDI spectra from one molecular fragment in a sample.

It was hypothesized that MALDI MS applications that use ion intensity will benefit if spectra are pre-processed to sum all ions arising from a particular biomarker at a single m/z value, such as its singly protonated molecule (M+1). In Electrospray MS, a similar computational operation on spectra is known as Charge State Deconvolution.

To examine this hypothesis, a sample comprising bovine insulin was submitted to MALDI-MS. See, FIG. 1. Four peaks associated with insulin were observed, representing insulin and three different acetone fragment adducts. Acetone (M.W. 58) can react with aromatic amines to form an adduct in which water (M.W. 18) is lost (a Schiff Base reaction.). The adduct is 40 mass units heavier than the original amine. In FIG. 1 the four peaks represent unreacted insulin, and insulin with—respectively—one, two, or three of the available aromatic amines (lysine amino acid residues) reacted. These four ions appear only 20 mass units apart, rather than 40, because all four of the ions shown are doubly charged, thus appearing at intervals of m/z=40/2=20. Out of frame to the right, there were four more peaks of twice the apparent mass formed by the four adducts in a singly charged ion. Out of frame to the left were another cluster of four peaks appearing 40/3=13.3 units apart. All twelve of these ions came from the same original insulin molecule, so the sum of these twelve peak intensities would better represent the amount of insulin sampled than would any one or subset of them.

Example 2

This example demonstrates that deconvolution of MALDI spectra data from complex biological samples improves reproducibility of the data.

To identify charge state of each ion cluster, we performed the following analyses on twenty-nine *Salmonella enterica* isolates (21 of serotype Heidelberg, 3 Anatum, 3 Worthington and 2 Muenster) from a turkey production environment. From the high mass end of the spectrum, we divided each ion peak by 2 or 3, look there for a corresponding peak. Ions at small integer dividends are then tabulated together with the largest, assumed to be a+1 charge state. Based on the assigned charge state, sum intensities (in the raw spectra) arising from nearby adducts or losses were calculated at their charge-state-predicted interval. The total around each same-charge-state cluster were added to the total for the same biomarker at its other identified charge states. Spectra were smoothed, the background was subtracted and then peaks were detected. Deconvolution was based on peaks at least 3% intensity of the base peak.

Figure 2:
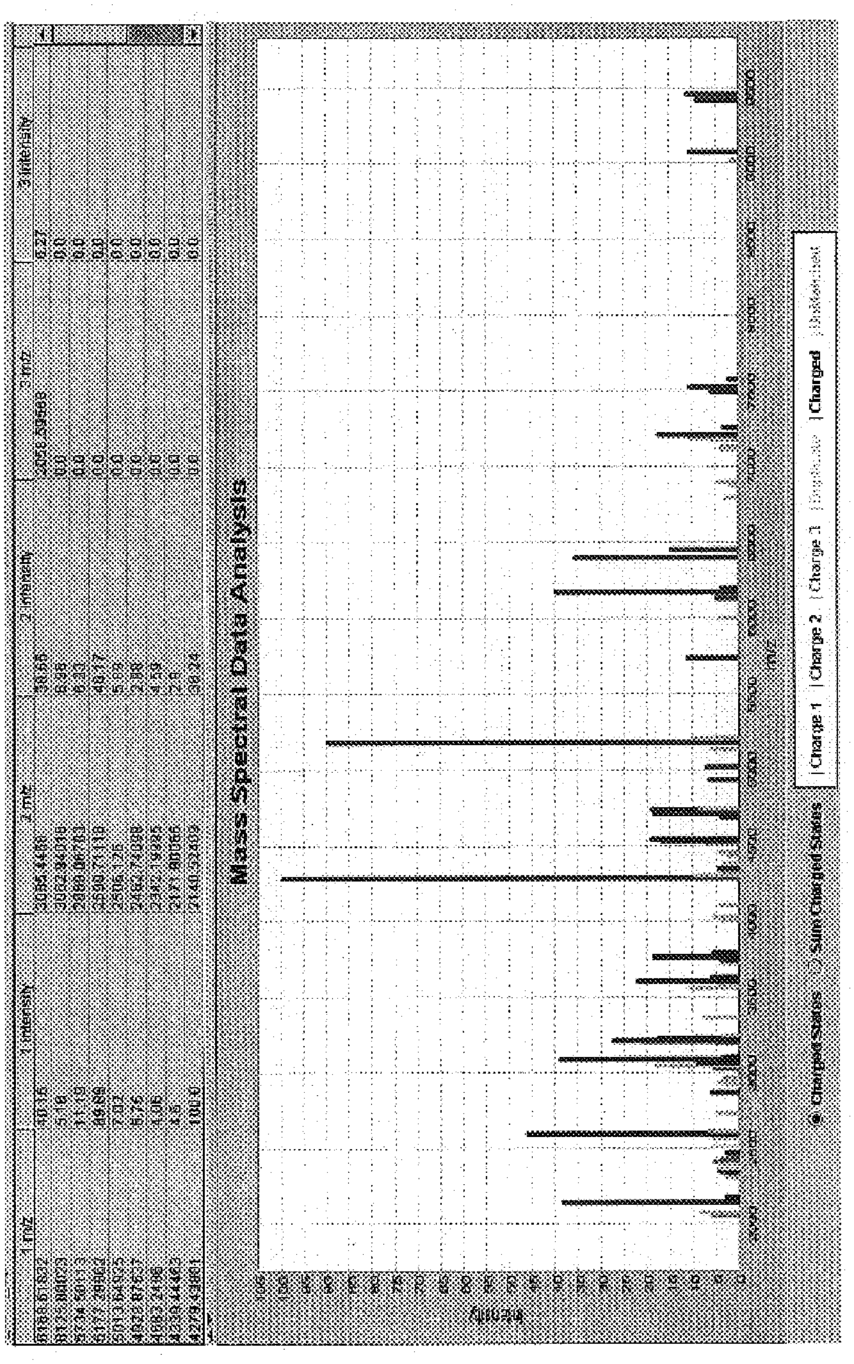
FIG. 2 is a typical centroided MALDI spectrum of a strain of *Salmonella enterica* serotype Anatum. Light Gray bars indicate peaks that have no observable markers of presumptively different charge and are, therefore, taken as singly-charged. Colored peaks represent fragments that display different charge states. Those familiar with MALDI MS of whole bacterial cells may be surprised at the extent to which doubly- and triply-charged ions appear in the spectrum.
Figure 3:
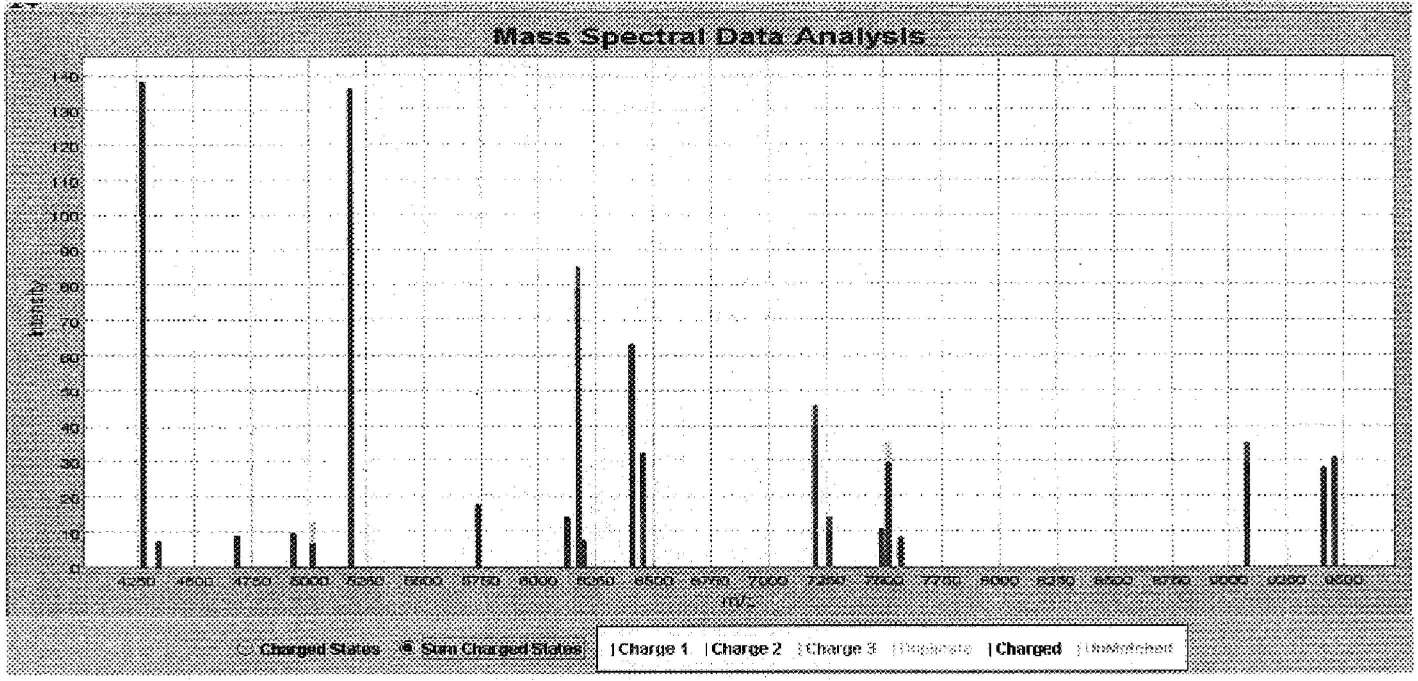
FIG. 3 is the centroided MALDI mass spectrum of *Salmonella enterica* Anatum of FIG. 2 with intensities for peaks of the same mass but different charge summed and shown at the singly-charged mass. This gives a simplified, true-mass spectrum for the mixture.

The method of the present example obtained triplicate pyrolysis spectra using MAB ionization on a reflectron TOF mass spectrometer and triplicate linear mode positive ion MALDI spectra using CHCA matrix on a research grade MS. The Py-MAB-MS characterization was compared to that obtained by the non-MS methods. Similarly, the MALDI-MS characterization was analyzed as a function of charge-state-deconvolution. Compare, e.g., FIGS. 2 and 3, representing peak-identified and the charge deconvoluted versions of a single spectrum, respectively.

The *Salmonella enterica* isolates were also typed by their antibiotic resistance and Pulsed-Field Gel Electrophoresis (PFGE) patterns. The isolates' resistance profile, a common and obviously important phenotypic assay, was determined for twenty antibiotics commonly used in veterinary medicine to control *Salmonella* infections. PFGE is the most common and widely accepted genotypic method currently in use. The PFGE patterns were analyzed by statistical pattern recognition to produce a dendrogram in which similar gel patterns are clustered so that they appear in or near the same branch of a similarity "tree." Then the two types of mass spectra for the same twenty-nine samples, under several variations, were also evaluated by pattern recognition. The two MS methods' abilities to distinguish similar but distinct samples, as determined by the PFGE and antibiotic resistance assays, were compared as a function of the experimental and data treatment variations.

Table 1 shows the 29 *Salmonella enterica* isolates, from a single turkey processing facility, characterized by serotype, antibiotic-resistance phenotype, and MIC values.

TABLE 1

The 29 *Salmonella enterica* isolates, each characterized by serotype, antibiotic-resistance phenotype, and MIC values.

| ID | | Antibiotic-resistance | MIC (μg/mL) | | | | | | |
|---|---|---|---|---|---|---|---|---|---|
| no. | Serotype | phenotype* | Te | St | Ge | Spt | Er | Ri | No |
| | Anatum | Te St Er B No Ri | 512 | 256 | >256 | | 128 | 512 | >1024 |
| | Anatum | Te St Er B No Ri | 256 | 256 | >256 | | 128 | 512 | >1024 |
| | Anatum | Te St Er B No Ri | 256 | 256 | >256 | | 256 | 256 | >1024 |

TABLE 1-continued

The 29 *Salmonella enterica* isolates, each characterized by serotype, antibiotic-resistance phenotype, and MIC values.

| ID | | Antibiotic-resistance | MIC (μg/mL) | | | | | | |
|---|---|---|---|---|---|---|---|---|---|
| no. | Serotype | phenotype* | Te | St | Ge | Spt | Er | Ri | No |
| | Heidelberg | Er B No Ri | | | | | 512 | 128 | >1024 |
| | Heidelberg | Te Sxt Er B No Ri | 128 | | | | 128 | 256 | >1024 |
| | Heidelberg | St Spt Ge Er B No Ri | | >256 | 256 | >512 | >512 | 512 | >1024 |
| | Heidelberg | St Spt Ge Er B No Ri | | >256 | 256 | >512 | 128 | 1024 | >1024 |
| | Heidelberg | Er B No Ri | | | | | 512 | 512 | >1024 |
| | Heidelberg | St Spt Ge Er B No Ri | | >256 | 256 | >512 | 512 | 1024 | >1024 |
| 0 | Heidelberg | Te St Spt Ge Er B No Ri | 256 | >256 | >256 | >512 | 512 | 1024 | >1024 |
| 1 | Heidelberg | St Spt Ge Er B No Ri | | >256 | 256 | >512 | 512 | 1024 | >1024 |
| 2 | Heidelberg | Er B No Ri | | | | | 256 | 1024 | >1024 |
| 3 | Heidelberg | St Spt Ge Er B No Ri | | >256 | 256 | >512 | 512 | 1024 | >1024 |
| 4 | Heidelberg | St Spt Ge Er B No Ri | | >256 | 256 | >512 | 512 | 1024 | >1024 |
| 5 | Heidelberg | St Spt Ge Er B No Ri | | >256 | >256 | >512 | 512 | 512 | >1024 |
| 6 | Heidelberg | St Spt Ge Er B No Ri | | >256 | 256 | >512 | 256 | 512 | >1024 |
| 7 | Worthington | Te Er B No Ri | 32 | | | | 128 | 512 | >1024 |
| 8 | Heidelberg | St Spt Ge Er B No Ri | | >256 | 256 | >512 | 128 | 1024 | >1024 |
| 9 | Heidelberg | Er B No Ri | | | | | 256 | 1024 | >1024 |
| 0 | Heidelberg | St Spt Ge Er B No Ri | | >256 | 256 | >512 | 512 | 512 | >1024 |
| 1 | Heidelberg | St Spt Ge Er B No Ri | | >256 | >256 | >512 | 128 | 512 | >1024 |
| 2 | Heidelberg | St Spt Ge Er B No Ri | | >256 | 256 | >512 | 128 | 1024 | >1024 |
| 3 | Heidelberg | Er B No Ri | | | | | 256 | 1024 | >1024 |
| 4 | Heidelberg | Te St Spt Ge Er B No Ri | 256 | >256 | 128 | >512 | 256 | 1024 | >1024 |
| 5 | Heidelberg | Er B No Ri | | | | | 256 | 512 | >1024 |
| 6 | Worthington | Te Er B No Ri | 32 | | | | 64 | 1024 | >1024 |
| 7 | Worthington | Te Er B No Ri | 32 | | | | 128 | 1024 | >1024 |
| 8 | Muenster | Er B No Ri | | | | | 512 | 1024 | >1024 |
| 9 | Muenster | St Ge To Te Er B No Ri | | >256 | >256 | | 32 | 1024 | >1024 |

Figure 4:
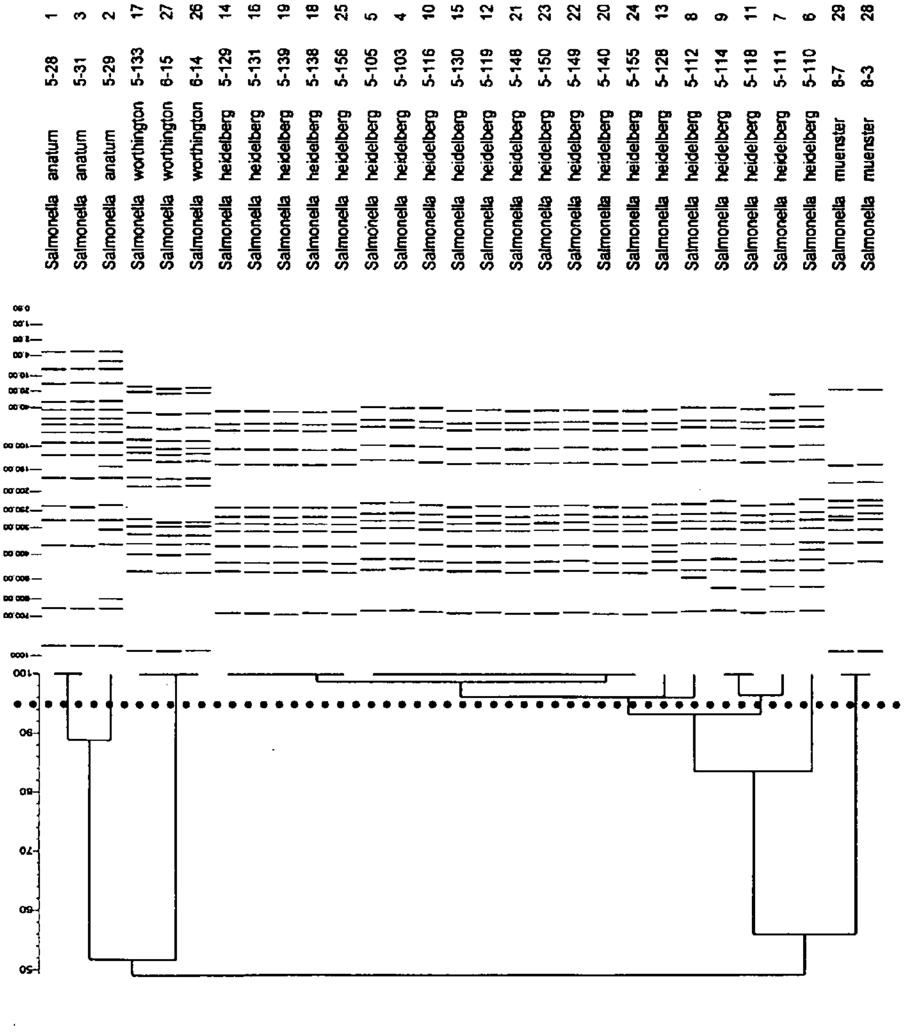
FIG. 4 is the result of the pulsed-field gel electrophoresis (PFGE) analysis of the 29 *Salmonella enterica* isolates of Example 2.

FIG. 4 shows results of PFGE analysis for the same isolates. Clearly, PFGE segregates the samples by serotype. Detailed analysis of further levels of PFGE distinction suggests that antibiotic resistance characteristics do not make a major contribution to observed PFGE pattern differences.

Py-MAB-MS provided excellent results in the characterization of the microorganisms. FIG. 5 shows that the difference between same-serotype average correlation and different serotype average correlations nearly doubled for deconvoluted spectra compared to direct spectra. Thus, MALDI-MS provided improved results when spectra were charge-state-deconvoluted prior to pattern comparison. Moreover, Charge-State Deconvolution has applications in rapid microbial identification as well as differential protein expression experiments (e.g. —SELDI MS).

Figure 6:
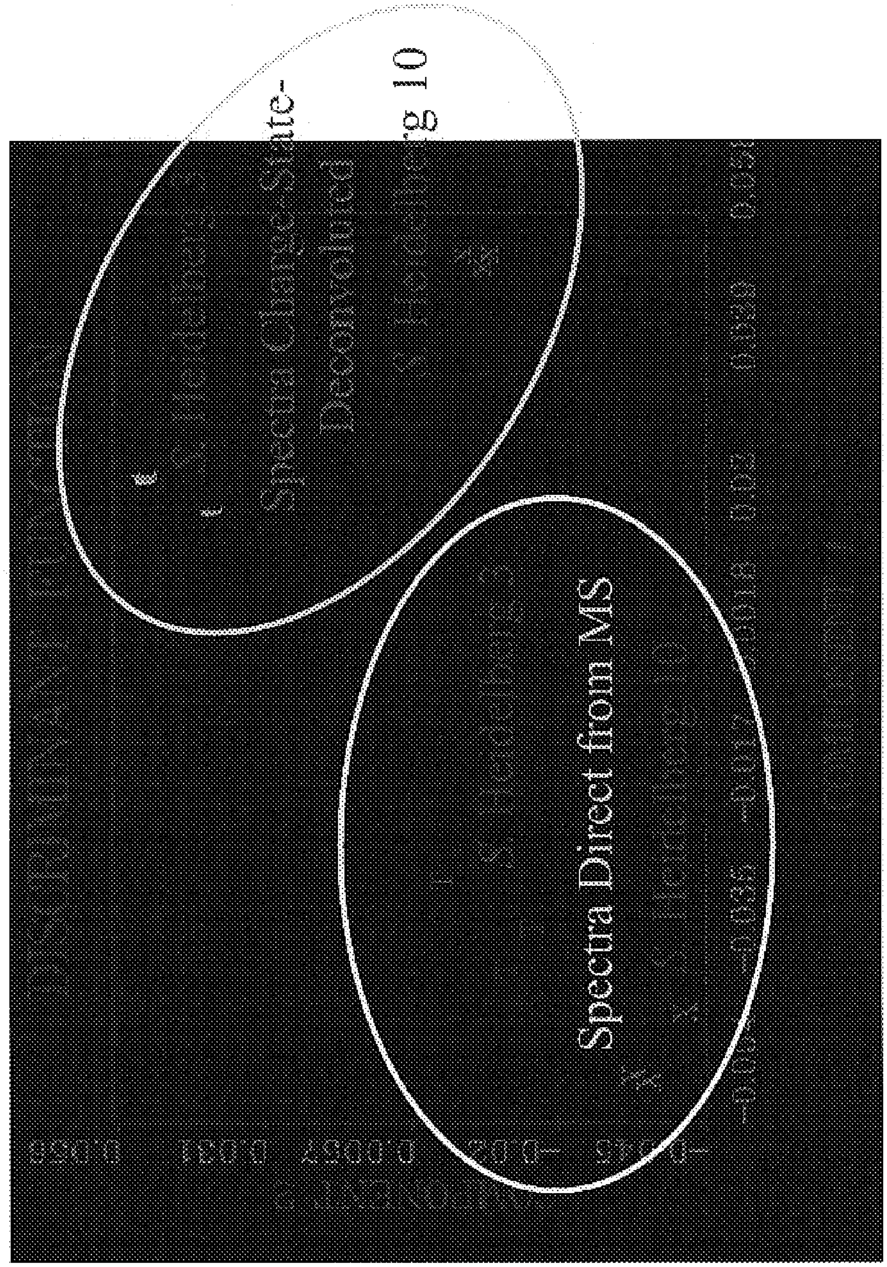
FIG. 6 shows analysis of replicate spectra from *S. Heidelberg* serotypes 3 and 10 using direct data or deconvoluted data. Note that the deconvoluted data within replicates are more similar than non-deconvoluted replicates. However, deconvoluted data from different serotypes were more different than non-deconvoluted data, showing that deconvoluted data allows for reproducibly better discrimination between different samples.
Figure 7:
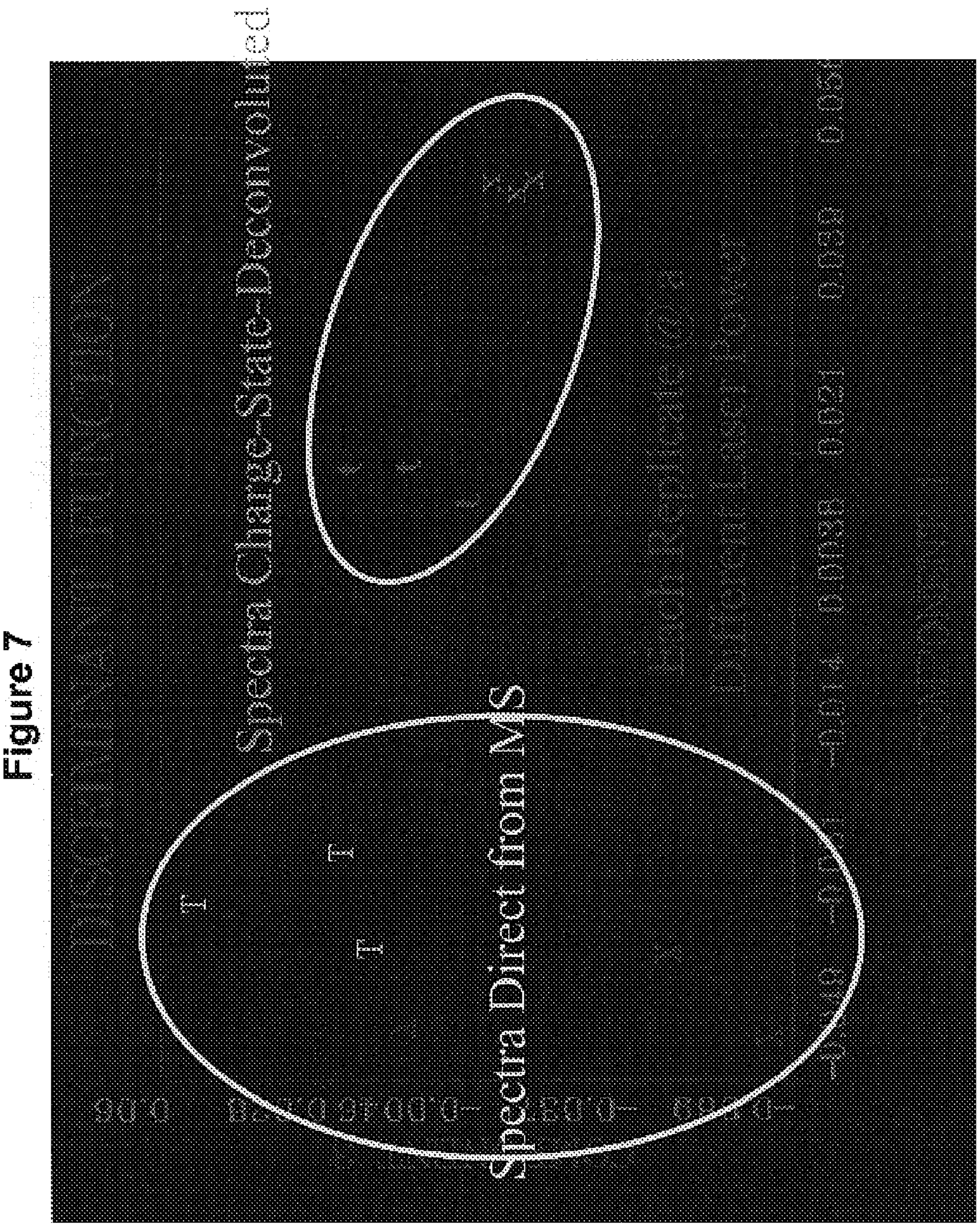
FIG. 7 shows an analysis identical to FIG. 7, but laser intensities (known to affect MALDI ion ratios, especially for biochemical mixtures) were intentionally varied. In this case, three of six comparisons showed improvement due to charge-state-deconvolution, but only one resulted in a cross-correlation low enough to characterize the two strains as different, again demonstrating that deconvolution improves discrimination between samples.

*S. Heidelberg* 3 (serotype Anatum) and *S. Heidelberg* 10 (serotype heidelberg) differ not only in serotype but by PFGE as shown in FIG. 4. Three replicate spectra from each strain were determined and compared either prior to deconvolution or after de-convolution. FIG. 6 illustrates that the direct spectral data did not necessarily distinguish the *S. Heidelberg* 3 strain replicates from the *S. Heidelberg* 10 strain replicates, whereas the deconvoluted data much more clearly clumped *S. Heidelberg* 3 strain replicates together and *S. Heidelberg* 10 strain replicates together and both clusters away from each other. This paradigm held even when each replicate was performed at a different laser power, demonstrating that deconvolution allows for pattern recognition even from spectra created under different conditions. See, FIG. 7.

To further confirm that deconvolution was useful in distinguishing different samples, we compared direct and deconvoluted spectra from rat liver samples, some of which were cancerous. As shown in FIG. 8, the difference of average correlations between same groups and different groups was nearly doubles when deconvolution was used.

It is possible that two identical or similar monomers may be combined to form a dimmer in one peak of a spectrum. This may occur, e.g., when the concentration of analyte is high.

With respect to dimers observed in a low-resolution instrument, they would typically be identified by their doubled mass, rather than from their isotope pattern because they would appear at fairly high m/z values where observation of $^{13}C$ isotopes may bemore difficult (with today's available linear TOF MS resolution). Thus, a dimer/singly charged pair would appear as if they were a singly-charged/doubly-charged pair. If there were also a real doubly-charged species, it would appear as if it were quadrupally-charged relative to the unrecognized dimer. We have not observed quadrupally-charged MALDI ions of significant intensity from bacterial spectra, so the simultaneous observation of a "quadrupally"-charged ion having significant intensity and a missing triply-charged ion could serve as a marker of erroneous charge state assignment. This assessment would require a more sophisticated algorithm, but is not difficult to implement. Whenever one observes populated +4, +2, and +1 bins (and an unpopulated +3 bin) in the table of corresponding ions, move the values to the right (+4 to +2 column; +2 to +1 column, +1 to dimer column) look again for a +3 and add it in to the +3 column. For charge-state deconvolution, add the now recognized dimer with doubled intensity (because each dimer ion actually represents two molecules) where it really belongs in the +1 column.

If the simpler code is used without such a sophisticated assessment, addition of intensities and mistaken assignment at the nominal mass of the dimer would retain many of the demonstrated pattern recognition/reproducibility advantages of representing all ions from equivalent molecules at the same nominal mass (a simple charge-state deconvolution). However, it could possibly compromise the use of these ions for mass-based identification of the protein. This mistake, however, could be remedied at the next stage of research involving sequencing the peak by MS/MS, Edmond, or other protein degradation experiments.

For pattern recognition, the misidentification of a dimer would reduce the advantages from charge-state deconvolution whenever adduct deconvolution was attempted. The "envelope" of adduct peaks would appear at incorrect relative masses, so the adduct peaks would be treated as unrelated proteins; which is exactly what is presently happening to all charge state variants when they are subject to pattern recognition. In cases where adduct, solvent etc., deconvolution is being attempted, anticipated adduct, solvent, or water loss peaks could be used to automate charge state deconvolution by a different sophisticated algorithm. One would look for the spacing of water loss peaks, for example, as a charge state indicator. A series of peaks spaced at m/z 36 (=2×18) could come from dimer ion showing water losses. A series spaced at m/z 18 on a nominally +2 envelope of ions, would show that the proper charge of each was +1. Any of these or analogous (adduct, solvent, acid residue, etc.) phenomena could be used for accurate, automated charge state assignment prior to deconvolution.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of detecting the presence of an analyte in a sample by mass spectrometry, wherein the mass spectrometry comprises Matrix-Assisted Laser Desorption/Ionization (MALDI), said method comprising:

(a) subjecting the sample to MALDI to generate sets of peaks of a mass spectrum of said sample;

(b) combining data, including peak height data of peaks within the sets of peaks of the mass spectrum of said sample, said peaks representing:

different charge states of a molecular fragment of a component of said sample, different adducts of a molecular fragment of a component of said sample, water loss of a molecular fragment of a component of said sample, different solvent interaction products of a molecular fragment of a component of said sample, or different isotopes from a molecular fragment of a component of said sample; and (c) comparing said data so combined to a library of deconvoluted reference mass spectral data representative of analytes of known identity, to thereby detect the presence in said sample of one of the analyte of said reference set.

2. The method according to claim 1 in which said analyte is a pathogenic microorganism and said library reference set comprises mass spectral data representative of pathogenic microorganisms.

3. The method according to claim 1 in which said analyte is a tissue sample and said library reference set comprises mass spectral data representative of cancerous tissues or cancerous cells.

4. The method according to claim 1 in which step (b) comprises combining data from a plurality of sets of peaks of said mass spectrum, the peaks of any single set representing different charge states of a molecular fragment, each set representing a different molecular fragment.

5. The method according to claim 1, further comprising:

(c) combining data from a set of peaks of a mass spectrum of said sample, said peaks representing different metal ion adducts of a molecular fragment of a component of said sample; and (d) comparing said data combined in step (c) to a library of reference sets of mass spectral data representative of analytes of known identity, to thereby detect the presence in said sample of one of the analytes of said reference set.

6. The method according to claim 5 in which step (c) comprises combining data from a plurality of sets of peaks of said mass spectrum, the peaks of any single set representing different metal ion adducts of a molecular fragment, each set representing a different molecular fragment.

7. The method according to claim 1 wherein said mass spectrum is a member selected from a negative ion mass spectrum and a positive ion mass spectrum.

8. The method according to claim 2 wherein said identifying includes characterizing said microorganism by a member selected from genus, species, serotype, and combinations thereof.

9. The method according to claim 2 further comprising identifying said pathogenic microorganism.

10. The method according to claim 1 wherein said data in step (b) is peak intensity data.

11. The method according to claim 5 wherein said data in step (c) is peak intensity data.

12. The method according to claim 1 wherein said library is prepared from about 10 to 10,000 reference mass spectra.

13. The method according to claim 12 wherein said library is prepared from about 50 to 1000 reference mass spectra.

14. The method according to claim 1 wherein said comparing utilizes a method selected from partial least squares, principal component analysis, principal component regression, artificial intelligence, artificial neural networks, fuzzy logic, expert systems, correlation analysis, computerized pattern recognition, cluster analysis and combinations thereof.

15. The method according to claim 14 wherein said comparing utilizes correlation analysis.

16. The method according to claim 14 wherein said comparing utilizes artificial intelligence.

17. The method according to claim 14 wherein said comparing utilizes automated expert system.

18. The method according to claim 14 wherein said comparing utilizes form cluster analysis.

19. The method according to claim 14 wherein said comparing utilizes principal component regression using principal component analysis.

20. The method according to claim 2 wherein said pathogenic microorganism is a bacterium and said mass spectrum is a mass spectrum of a whole cell or cell extract of said bacterium.

21. The method according to claim 2 wherein, prior to step (a), said pathogenic microorganism is cultured, thereby standardizing the spectral representation, increasing the population of said pathogenic microorganism in said sample or a combination thereof.

22. The method according to claim 2 wherein, prior to step (a), said pathogenic microorganism is separated from non-diagnostic debris in said sample.

23. The method according to claim 1 wherein said sample is acquired from a mammalian subject.

24. The method according to claim 18 wherein said mass spectrum is generated by a method that is a member selected from matrix assisted laser desorption/ionization mass spectrometry, matrix assisted laser desorption/ionization time-of-flight mass spectrometry, surface enhanced laser desorption mass spectrometry, fast atom bombardment mass spectrometry, chemical ionization mass spectrometry, secondary ion mass spectrometry, and field desorption mass spectrometry.

25. The method according to claim 19 wherein said mass spectrum is generated by matrix assisted laser desorption/ionization mass spectrometry utilizing a mixture of a matrix material and said sample wherein said mixture is dispersed between two layers of said matrix material.

26. The method according to claim 19 wherein said mass spectrum is generated by matrix assisted laser desorption/ionization mass spectrometry utilizing a dried mixture of a matrix material and said sample wherein said mixture is exposed to ultrasound during drying.

27. The method according to claim 1 further comprising:

(d) combining data from a set of peaks of a positive ion mass spectrum of said sample with a set of peaks of a negative ion mass spectrum of said sample, said peaks representing different charge states of a molecular fragment of a component of said sample.

28. The method according to claim 1, wherein the combined peaks represent different charge states of a molecular fragment of a component of said sample.

29. The method according to claim 1, wherein the combined peaks represent different metal adducts, and optionally different charge states, of a molecular fragment of a component of said sample.

30. The method according to claim 1, wherein the combined peaks represent different solvent interaction products, and optionally different charge states, of a molecular fragment of a component of said sample.

31. The method according to claim 1, wherein the combined peaks represent different isotopes, and optionally different charge states, from a molecular fragment of a component of said sample.

32. A method of detecting the presence of an analyte in a sample from a biological material by mass spectrometry, wherein the mass spectrometry comprises Matrix-Assisted Laser Desorption/Ionization (MALDI), said method comprising:

(a) subjecting the sample to MALDI to generate sets of peaks of a mass spectrum of said sample;

(b) combining data, including peak height data from peaks within the sets of peaks of the mass spectrum of said sample, said peaks representing:

different charge states of a molecular fragment of a component of said sample, different adducts of a molecular fragment of a component of said sample, water loss of a molecular fragment of a component of said sample, different solvent interaction products of a molecular fragment of a component of said sample, or different isotopes from a molecular fragment of a component of said sample; and (c) determining the presence of an analyte in a sample based on the combined data.

* * * * *